United States Patent
Wood

(10) Patent No.: US 6,691,039 B1
(45) Date of Patent: Feb. 10, 2004

(54) REMOVAL OF NOISE FROM SEISMIC DATA USING IMPROVED RADON TRANSFORMATIONS

(75) Inventor: Lawrence C. Wood, Houston, TX (US)

(73) Assignee: John M. Robinson ( * ) Notice: Subject to any disclaimer, the term of this patent is extended or adjusted under 35 U.S.C. 154(b) by 7 days.

(21) Appl. No.: 10/232,118

(22) Filed: Aug. 30, 2002

(Under 37 CFR 1.47)

(51) Int. Cl.$^7$ ................................................. G01V 1/28
(52) U.S. Cl. ........................................... 702/17; 702/16
(58) Field of Search .............................. 702/14, 17, 18; 367/73

(56) References Cited

U.S. PATENT DOCUMENTS

| | | | |
|---|---|---|---|
| 5,138,583 A | * 8/1992 | Wason et al. | 702/17 |
| 5,189,644 A | 2/1993 | Wood | 367/38 |
| 5,583,825 A | * 12/1996 | Carrazzone et al. | 702/17 |
| 6,094,620 A | * 7/2000 | Gasparotto et al. | 702/14 |
| 6,507,787 B1 | * 1/2003 | Filpo Ferreira Da Silva et al. | 702/14 |

OTHER PUBLICATIONS

Belkin, Gregory, *Discrete Radon Transform*, IEEE Transactions on Acoustics Speech and Signal Processing, vol. AASP–35, pp. 162–172 (1987).
Bergler, Steffen et al., *Hyperbolic Reflection Moveout Revisited*, EAGE 1951–2001 (2001), p. 64–66.
Dix, C. H., *Seismic Velocities from Surface Measurements*, 20(1) Geophysics 68–86 (1955).
Durbaum, H., *Zur Bestimmung von Wellengeschwindigkeiten aus Reflexionsseismischen Messungen*, 2(2) Geophys.Prosp. 151–76 (1954).
Hagedoorn, H., *A Process of Seismic Reflection Interpretation*, 2(2) Geophys.Prosp. 85–127 (1954).
Hampson, D., *Inverse Velocity Stacking for Multiple Elimination*, 22 J.Can.Soc.Expl.Geophys. 44–45 (1986).
Hampson, D., *The Discrete Radon Transform: A New Tool for Image Enhancement and Noise Suppression*, Society of Exploration Geophysicists 57$^{th}$ Annual International Meeting, Expanded Abstracts pp. 141–143.

(List continued on next page.)

Primary Examiner—Donald E. McElheny, Jr.
(74) Attorney, Agent, or Firm—Keith B. Willhelm

(57) ABSTRACT

Methods of processing seismic data to remove unwanted noise from meaningful reflection signals are provided for. An offset weighting factor $x^n$ is applied to the amplitude data, wherein $0<n<1$, and the offset weighted data is transformed from the offset-time domain to the time-slowness domain using a Radon transformation. A corrective filter is then applied to enhance the primary reflection signal content of the data and to eliminate unwanted noise events. After filtering, the enhanced signal content is inverse transformed from the time-slowness domain back to the offset-time domain using an inverse Radon transformation, and an inverse of the offset weighting factor $p^n$ is applied to the inverse transformed data, wherein $0<n<1$. Suitable forward and reverse Radon transformations incorporating the offset weighting factor and its inverse include the following continuous transform equations, and discrete versions thereof that approximate the continuous transform equations:

$$u(p, \tau) = \int_{-\infty}^{\infty} dx \int_{-\infty}^{\infty} dt\, d(x, t) x^n \delta[f(t, x, \tau, p)] \quad \text{(forward transform)}$$

$$d(x, t) = \int_{-\infty}^{\infty} dp \int_{-\infty}^{\infty} d\tau p^n \rho(\tau)^* u(p, \tau) \delta[g(t, x, \tau, p)] \quad \text{(inverse transform)}$$

27 Claims, 24 Drawing Sheets

(4 of 24 Drawing Sheet(s) Filed in Color)

OTHER PUBLICATIONS

Hargreaves, Neil et al., *High–Resolution Radon Demultiple*, Society of Exploration Geophysicists International Exposition and 71$^{st}$ Annual Meeting, Expanded Abstracts with Biographies vol. I, pp. 1325–1338 (Tulsa, Oklahoma, Society of Exploration Geophysicists, Sep. 9–14, 2001).

Herrman, P., et al., *De–Aliased, High–Resolution Radon Transforms*, Society of Exploration Geophysicists 70$^{th}$ Annual International Meeting, SP2.3 (2000), p. 1953–1956.

Krey, T., *An Approximate Correction Method for Refraction in Reflection Seismic Prospecting*, 16(3) Geophysics 468–85 (1951).

Krey, T., *Bemerkungen zu Einer Formel fur Geschwindigkeitsbestimmungen aus Seismischen Messungen von C. H. Dix*, 7 Erdol und Kohle 8–9 (1954).

Mayne, W. H., *Common Reflection Point Horizontal Data Stacking Techniques*, 27(6) Geophysics 927–38 (1962).

O'Brien, P. N. S., et al., *Velocity Dispersion of Seismic Waves*, 19 Geophysical Prospecting 1–26 (1971).

Sacchi, M.D., et al., *Fast High Resolution Parabolic Radon Transform*, Society of Exploration Geophysicists 69$^{th}$ Annual International Meeting, SPRO P1.1 (1999), p. 1477–1480.

Sacchi, M. D., et al., *High–Resolution Velocity Gathers and Offset Space Reconstruction*, 60(4) Geophysics 1169–1177 (1995).

Shah, P. M., *Use of Wavefront Curvature to Relate Seismic Data with Subsurface Parameters*, 38(5) Geophysics 812–825 (1973).

Thorson, J. R. et al., *Velocity–Stack and Slant–Stack Stochastic Inversion*, 50 Geophysics 2727–41 (1985).

Yilmaz, Ozdogan, Seismic Data Analysis: Processing, Inversion, and Interpretation of Seismic Data, vol. 1, pp. 938–948 (Tulsa, Oklahoma, Society of Exploration Geophysicists, 2001).

\* cited by examiner

REMOVAL OF NOISE FROM SEISMIC DATA USING IMPROVED RADON TRANSFORMATIONS

BACKGROUND OF THE INVENTION

The present invention relates to processing of seismic data representative of subsurface features in the earth and, more particularly, to improved methods of processing seismic data to remove unwanted noise from meaningful reflection signals.

Seismic surveys are one of the most important techniques for discovering the presence of oil and gas deposits. If the data is properly processed and interpreted, a seismic survey can give geologists a picture of subsurface geological features, so that they may better identify those features capable of holding oil and gas. Drilling is extremely expensive, and ever more so as easily tapped reservoirs are exhausted and new reservoirs are harder to reach. Having an accurate picture of an area's subsurface features can increase the odds of hitting an economically recoverable reserve and decrease the odds of wasting money and effort on a nonproductive well.

The principle behind seismology is deceptively simple. As seismic waves travel through the earth, portions of that energy are reflected back to the surface as the energy waves traverse different geological layers. Those seismic echoes or reflections give valuable information about the depth and arrangement of the formations, some of which hopefully contain oil or gas deposits.

A seismic survey is conducted by deploying an array of energy sources and an array of sensors or receivers in an area of interest. Typically, dynamite charges are used as sources for land surveys, and air guns are used for marine surveys. The sources are discharged in a predetermined sequence, sending seismic energy waves into the earth. The reflections from those energy waves or "signals" then are detected by the array of sensors. Each sensor records the amplitude of incoming signals over time at that particular location. Since the physical location of the sources and receivers is known, the time it takes for a reflection signal to travel from a source to a sensor is directly related to the depth of the formation that caused the reflection. Thus, the amplitude data from the array of sensors can be analyzed to determine the size and location of potential deposits.

This analysis typically starts by organizing the data from the array of sensors into common geometry gathers. That is, data from a number of sensors that share a common geometry are analyzed together. A gather will provide information about a particular spot or profile in the area being surveyed. Ultimately, the data will be organized into many different gathers and processed before the analysis is completed and the entire survey area mapped.

The types of gathers typically used include: common midpoint, where the sensors and their respective sources share a common midpoint; common source, where all the sensors share a common source; common offset, where all the sensors and their respective sources have the same separation or "offset"; and common receiver, where a number of sources share a common receiver. Common midpoint gathers are the most common gather today because they allow the measurement of a single point on a reflective subsurface feature from multiple source-receiver pairs, thus increasing the accuracy of the depth calculated for that feature.

The data in a gather is typically recorded or first assembled in the offset-time domain. That is, the amplitude data recorded at each of the receivers in the gather is assembled or displayed together as a function of offset, i.e., the distance of the receiver from a reference point, and as a function of time. In theory, when the gathered data is displayed in the offset-time domain, or "X-T" domain, the amplitude peaks corresponding to reflection signals detected at the gathered sensors should align into patterns that are referred to as kinematic travel time trajectories. It is from those trajectories that one ultimately may determine an estimate of the depths at which formations exist.

A number of factors, however, make the practice of seismology and, especially, the interpretation of seismic data much more complicated than its basic principles. First, the reflected signals that indicate the presence of geological strata typically are mixed with a variety of noise.

The most meaningful signals are the so-called primary reflection signals, those signals that travel down to the reflective surface and then back up to a receiver. When a source is discharged, however, a portion of the signal travels directly to receivers without reflecting off of any subsurface features. In addition, a signal may bounce off of a subsurface feature, bounce off the surface, and then bounce off the same or another subsurface feature, one or more times, creating so-called multiple reflection signals. Other portions of the signal turn into noise as part of ground roll, refractions, and unresolvable scattered events. Some noise, both random and coherent, is generated by natural and man-made events outside the control of the survey.

All of this noise is occurring simultaneously with the reflection signals that indicate subsurface features. Thus, the noise and reflection signals tend to overlap when the survey data is displayed in X-T space. The overlap can mask primary reflection signals and make it difficult or impossible to identify patterns in the display upon which inferences about subsurface geology may be drawn. Accordingly, various mathematical methods have been developed to process seismic data in such a way that noise is separated from primary reflection signals.

Many such methods seek to achieve a separation of signal and noise by transforming the data from the X-T domain to other domains. In other domains, such as the frequency-wavenumber (F-K) domain or the time-slowness (Tau-P), there is less overlap between the signal and noise data. Once the data is transformed, various mathematical filters are applied to the transformed data to eliminate as much of the noise as possible and, thereby, to enhance the primary reflection signals. The data then is inverse transformed back into the offset-time domain for interpretation or further processing.

For example, so-called Radon filters are commonly used to attenuate or remove multiple reflection signals. Such methods typically first process a data gather to compensate for the increase in travel time as sensors are further removed from the source (normal moveout or "NMO" correction). After NMO correction, the data is transformed along kinematic travel time trajectories in offset-time space to corresponding trajectories in time-slowness space, where slowness p is defined as reciprocal velocity (or p=1/v). Primary reflection signal trajectories will transform into different regions of time-slowness space than the multiple reflection signals. Thus, the primary reflection signals are isolated from multiple reflections and may be muted, leaving only the signals for multiple reflections. The data is then transformed back into offset-time space, and the data which has not been muted is then subtracted from the original data gather. Thus, the multiple reflection signals are removed from the data gather, leaving the primary reflection signals more readily apparent and easier to interpret.

It will be appreciated, however, that in such prior art Radon filters, the multiples recorded by receivers closer to the gather reference point are not as effectively separated from the primary reflections. Thus, those multiples are not subtracted from the original data gather and, when the data ultimately is interpreted, remain present as noise that can mask primary reflection signals.

Radon filters have been developed for use in connection with common source, common receiver, common offset, and common midpoint gathers. They include those based on linear slant-stack, parabolic, and hyperbolic kinematic travel time trajectories. The general case forward transformation equation used in Radon filtration processes, $R(p, \tau)[d(x, t)]$, is set forth below:

$$u(p, \tau) = \int_{-\infty}^{\infty} dx \int_{-\infty}^{\infty} dt\, d(x, t) \delta[f(t, x, \tau, p)]$$

(forward transformation)
where
  $u(p, \tau)$=transform coefficient at slowness p and zero-offset time
  $\tau d(x, t)$=measured seismogram at offset x and two-way time t
  p=slowness
  t=two-way travel time
  $\tau$=two-way intercept time at p=0
  x=offset
  $\delta$=Dirac delta function
  $f(t, x, \tau, p)$=forward transform function The forward transform function for linear slant stack kinematic travel time trajectories is as follows:

$$f(t, x, \tau, p)=t-\tau-px$$

where $$\delta[f(t, x, \tau, p)]=\delta(t-\tau-px)$$
$$=1, \text{ when } t=\tau+px, \text{ and}$$
$$=0, \text{ elsewhere.}$$

Thus, the forward linear slant stack Radon transformation equation becomes $$u(p, \tau) = \int_{-\infty}^{\infty} dx\, d(x, \tau + px)$$

The forward transform function for parabolic kinematic trajectories is as follows:

$$f(t, x, \tau, p)=t-\tau-px^2$$

where $$\delta[f(t, x, \tau, p)]=\delta(t-\tau-px^2)$$
$$=1, \text{ when } t=\tau+px^2, \text{ and}$$
$$=0, \text{ elsewhere.}$$

Thus, the forward parabolic Radon transformation equation becomes $$u(p, \tau) = \int_{-\infty}^{\infty} dx\, d(x, \tau + px^2)$$

The forward transform function for hyperbolic kinematic travel time trajectories is as follows:

$$f(t, x, \tau, p)=t-\sqrt{\tau^2+p^2x^2}$$

where $$\delta[f(t, x, \tau, p)] = \delta(t - \sqrt{\tau^2 + p^2x^2})$$
$$= 1, \text{ when } t = \sqrt{\tau^2 + p^2x^2}, \text{ and}$$
$$= 0, \text{ elsewhere.}$$

Thus, the forward hyperbolic Radon transformation equation becomes $$u(p, \tau) = \int_{-\infty}^{\infty} dx\, d(x, \sqrt{\tau^2 + p^2x^2})$$

A general case inverse Radon transformation equation is set forth below:

$$d(x, t) = \int_{-\infty}^{\infty} dp \int_{-\infty}^{\infty} d\tau \rho(\tau)^* u(p, \tau) \delta[g(t, x, \tau, p)]$$

(inverse transformation)
where
  $g(t, x, \tau, p)$=inverse transform function, and
  $\rho(\tau)^*$=convolution of rho filter.

The inverse transform function for linear slant stack kinematic trajectories is as follows:

$$g(t, x, \tau, p)=\tau-t+px$$

Thus, when $\tau=t-px$, the inverse linear slant stack Radon transformation equation becomes $$d(x, t) = \int_{-\infty}^{\infty} dp\, \rho(\tau)^* u(p, t - px)$$

The inverse transform function for parabolic trajectories is as follows:

$$g(t, x, \tau, p)=\tau-t+px^2$$

Thus, when $\tau=t-px^2$, the inverse linear slant stack Radon transformation equation becomes $$d(x, t) = \int_{-\infty}^{\infty} dp\, \rho(\tau)^* u(p, t - px^2)$$

The inverse transform function for hyperbolic trajectories is as follows:

$$g(t, x, \tau, p)=\tau-\sqrt{t^2-p^2x^2}$$

Thus, when $\tau=\sqrt{t^2-p^2x^2}$, the inverse hyperbolic Radon transformation equation becomes $$d(x, t) = \int_{-\infty}^{\infty} dp\rho(\tau)^* u\left(p, \sqrt{t^2 - p^2x^2}\right)$$

To date, Radon transformations based on linear slant stack and parabolic trajectories have been more commonly used. In common midpoint gathers, however, primary reflection signals will generally have hyperbolic kinematic trajectories, thus, it would be preferable to use hyperbolic Radon transforms. The computational intensity of those equations, however, typically has precluded the use of fine sampling variables in performing the transformation.

In particular it will be noted that the transform function for hyperbolic trajectories contains a square root whereas those for linear slant stack and parabolic transform functions do not. Thus, as compared to linear slant stack and parabolic Radon transformations, the sampling variables used in performing hyperbolic Radon transformations are relatively coarse to compensate for the additional computations needed to handle square root computations. Increasing the magnitude of the sampling variables reduces the number of computations needed to process data, but the relative coarseness of the sampling variables reduces the accuracy of the process.

Forward and inverse hyperbolic Radon transforms also are not exact inverses of each other. Accordingly, an additional least-mean-squares ("LMS") energy minimization calculation is often used. Also, the data is typically processed to compensate for the diminution in amplitude as a signal travels through the earth ("amplitude balancing"), to NMO correct, or for various other reasons that require additional processing. Those calculations in general and, especially LMS analyses, are complex and require substantial computing time, even on advanced computer systems.

Moreover, a typical seismic survey may involve hundreds of sources and receivers, thus generating tremendous quantities of raw data. The data may be subjected to thousands of different data gathers. Once the gathers have been filtered, the gathers must be stacked, or compiled with other gathers, and subjected to further processing in order to make inferences about subsurface formations. Thus, and especially so when conventional hyperbolic Radon transformations and LMS calculations are used, the cost of processing seismic data can be extremely high. Moreover, because of the computational intensity of prior art processes and the attendant cost, it has been necessary to avoid the use of hyperbolic Radon transformations or to use relatively coarse sampling variables, thereby saving computations and cost. The computational savings, however, come at the price of reduced accuracy.

The velocity at which primary reflection signals are traveling, what is referred to as the stacking velocity, is used in various analytical methods that are applied to seismic data. For example, it is used in determining the depth and lithology or sediment type of geological formations in the survey area. It also is used various seismic attribute analyses. A stacking velocity function may be determined by what is referred to as a semblance analysis. Which such methods have provided reasonable estimations of the stacking velocity function for a data set, given the many applications based thereon, it is desirable to define the stacking velocity function as precisely as possible.

An object of this invention, therefore, is to provide a method for processing seismic data that more effectively removes unwanted noise from meaningful reflection signals.

It also is an object to provide such methods based on hyperbolic Radon transformations.

Another object of this invention is to provide methods for removal of noise from seismic data that are comparatively simple and require relatively less computing time and resources.

Yet another object is to provide methods for more accurately defining the stacking velocity function for a data set.

It is a further object of this invention to provide such methods wherein all of the above-mentioned advantages are realized.

Those and other objects and advantages of the invention will be apparent to those skilled in the art upon reading the following detailed description and upon reference to the drawings.

SUMMARY OF THE INVENTION

The subject invention provides for methods of processing seismic data to remove unwanted noise from meaningful reflection signals indicative of subsurface formations. The methods comprise the steps of obtaining field records of seismic data detected at a number of seismic receivers in an area of interest. The seismic data comprises signal amplitude data recorded over time by each of the receivers and contains both primary reflection signals and unwanted noise events. The seismic data is assembled into common geometry gathers in an offset-time domain.

An offset weighting factor $x^n$ is then applied to the amplitude data, wherein $0<n<1$, and the offset weighted data is transformed from the offset-time domain to the time-slowness domain using a Radon transformation. Such Radon transformations include the following continuous transform equation, and discrete versions thereof that approximate the continuous transform equation:

$$u(p, \tau) = \int_{-\infty}^{\infty} dx \int_{-\infty}^{\infty} dt\, d(x, t)x^n \delta[f(t, x, \tau, p)]$$

Radon transformations based on linear slant stack, parabolic, and other non-hyperbolic kinematic travel time trajectories may be used, but those based on hyperbolic Radon kinematic trajectories are preferred. Suitable hyperbolic Radon transformations include the following continuous transform equation, and discrete versions thereof that approximate the continuous transform equation:

$$u(p, \tau) = \int_{-\infty}^{\infty} dx\, x^n d\left(x, \sqrt{\tau^2 + p^2x^2}\right)$$

Preferably, only the datum having a slowness $p_d$ that is greater that a predetermined minimum, $p_{min}$, and less than a predetermined maximum, $p_{max}$, is transformed.

A corrective filter is then applied to enhance the primary reflection signal content of the data and to eliminate unwanted noise events. Preferably, the corrective filter is determined by performing a semblance analysis on the amplitude data to generate a semblance plot. A velocity analysis is then performed on the semblance plot, from which the corrective filter is defined. Preferably, the corrective filter is a time variant velocity filter.

After filtering, the enhanced signal content is inverse transformed from the time-slowness domain back to the offset-time domain using an inverse Radon transformation, and an inverse of the offset weighting factor $p^n$ is applied to the inverse transformed data, wherein $0<n<1$. Such Radon transformations include the following continuous inverse transform equation, and discrete versions thereof that approximate the continuous inverse transform equation:

$$d(x, t) = \int_{-\infty}^{\infty} dp \int_{-\infty}^{\infty} d\tau p^n \rho(\tau)^* u(p, \tau) \delta[g(t, x, \tau, p)]$$

Suitable hyperbolic inverse Radon transformations include the following continuous inverse transform equation, and discrete versions thereof that approximate the continuous inverse transform equation:

$$d(x, t) = \int_{-\infty}^{\infty} dp \, p^n \rho(\tau)^* u\left(p, \sqrt{t^2 - p^2 x^2}\right)$$

The signal amplitude data for the enhanced signal content is thereby restored. The processed and filtered data may then be subject to further processing by which inferences about the subsurface geology of the survey area may be made.

It will be appreciated that primarily because they utilize an offset weighting factor and its inverse, and avoid more complex mathematical operations required by prior art processes, the novel methods require less total computation time and resources. Thus, even though hyperbolic Radon transformations heretofore have generally been avoided because of their greater complexity relative to linear slant stack and parabolic Radon transformations, the novel processes are able to more effectively utilize hyperbolic Radon transformations and take advantage of the greater accuracy they can provide, especially when applied to common midpoint geometry gathers.

At the same time, because they are computationally less intensive, the sampling variables used in the transformations and semblance analyses may be set much finer than are typically used in prior art processes. $\Delta t$ and $\Delta \tau$ values may be set as low as the sampling rates at which the data was recorded, and $\Delta p$ values as low as about 0.5 $\mu$sec/m may be used. The use of finer sampling variables also allows for more accurate processing of data.

The subject invention also provides for methods of filtering seismic data to remove unwanted noise from meaningful reflection signals indicative of subsurface formations that comprise obtaining field records of seismic data detected at a number of seismic receivers in an area of interest. The seismic data comprises signal amplitude data recorded over time by each receiver and contains both primary reflection signals and unwanted noise events. Each of the amplitude datum has an associated slowness $p_d$.

The data is assembled into common geometry gathers in an offset-time domain. The amplitude data where $p_d$ is greater that a predetermined minimum, $p_{min}$, and less than a predetermined maximum, $p_{max}$, is then transformed from the offset-time domain to the time-slowness domain using a Radon transformation.

A corrective filter is then applied to the transformed data to enhance the primary reflection signal content of the data and to eliminate unwanted noise events, and the enhanced signal content is inverse transformed from the time-slowness domain back to the offset-time domain using an inverse Radon transformation. The signal amplitude data for the enhanced signal content is thereby restored.

Other methods of the subject invention comprise assembling seismic amplitude data into common geometry gathers in an offset-time domain and transforming the amplitude data from the offset-time domain to the time-slowness domain using a Radon transformation.

A semblance analysis is also performed on the amplitude data to generate a semblance plot. A velocity analysis is then performed on the semblance plot to define a stacking velocity function and a time variant corrective filter to enhance the primary reflection signal content of the transformed data and to eliminate unwanted noise events.

The corrective filter is then applied to the transformed data. The filtered date is inverse transformed from the time-slowness domain back to the offset-time domain using an inverse Radon transformation, thereby restoring the signal amplitude data for the filtered data.

Other methods comprise designing a Tau-P transform for each or the X-T common geometry gathers into which the seismic data has been assembled to determine the number of slownesses p and the $\Delta p$ value. A given choice of numbers of p's are then applied as a family of hyperbolas over the CMP gather's X-T space. Amplitudes over the family of hyperbolas defined by each p value are summed as a constant velocity hyperbolic time trajectory, and the amplitude data is transformed from the offset-time domain to the time-slowness domain using a Radon transformation.

A semblance analysis is then performed on the amplitude data using the $\Delta p$ value to generate a semblance plot. A velocity analysis is performed on the semblance plot to define a stacking velocity function and a time variant velocity filter to enhance the primary reflection signal content of the transformed data and to eliminate unwanted noise events, and the filter is applied to the transformed data. The filtered data is inverse transformed from the time-slowness domain back to the offset-time domain using an inverse Radon transformation, thereby restoring the signal amplitude data for the filtered data.

The subject invention also provides for methods for determining a stacking velocity function. The methods comprise the steps of processing and filtering the data as described above. A semblance analysis is performed on the restored data to generate a refined semblance plot, and a velocity analysis is performed on the refined semblance plot to define a refined stacking velocity function. Preferably, an offset weighting factor $x^n$ is first applied to the restored amplitude data, wherein $0<n<1$.

It will be appreciated that, because the semblance and velocity analysis is performed on data that has been more accurately processed and filtered, that the resulting stacking velocity function is more accurate. This enhances the accuracy of the many different seismic processing methods that utilize stacking velocity functions. Ultimately, the increased accuracy and efficiency of the novel processes enhances the accuracy of surveying underground geological features and, therefore, the likelihood of accurately locating the presence of oil and gas deposits.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DESCRIPTION OF ILLUSTRATIVE EMBODIMENTS

The subject invention is directed to improved methods for processing seismic data to remove unwanted noise from meaningful reflection signals and for more accurately determining the stacking velocity function for a set of seismic data.

Obtaining and Preparing Seismic Data for Processing

More particularly, the novel methods comprise the step of obtaining field records of seismic data detected at a number of seismic receivers in an area of interest. The seismic data comprises signal amplitude data recorded over time and contains both primary reflection signals and unwanted noise events.

Figure 1:
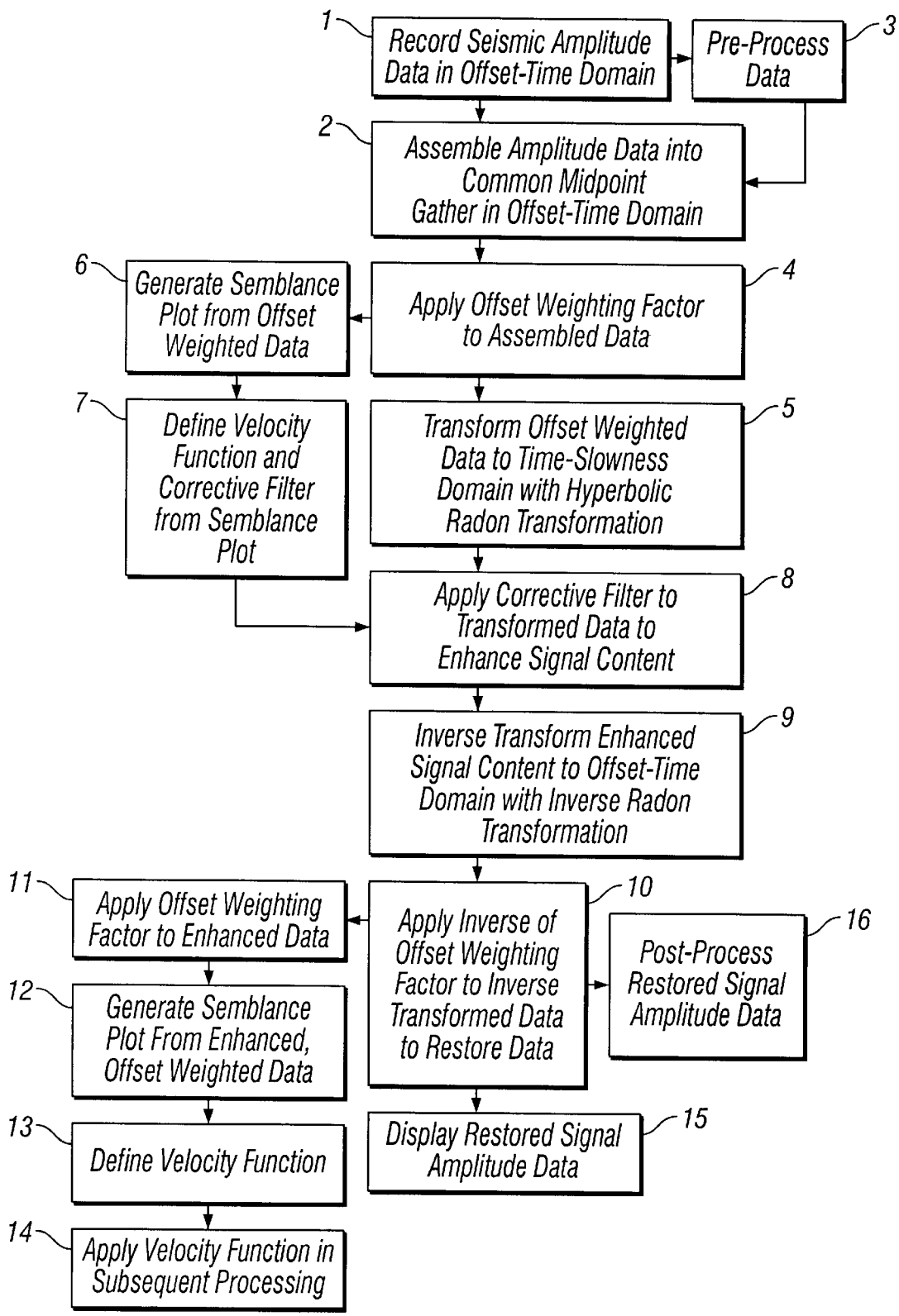
FIG. 1 is a schematic diagram of a preferred embodiment of the methods of the subject invention showing a sequence of steps for enhancing the primary reflection signal content of seismic data and for attenuating unwanted noise events, thereby rendering it more indicative of subsurface formations.

By way of example, a preferred embodiment of the methods of the subject invention is shown in the flow chart of FIG. 1. As shown therein in step 1, seismic amplitude data is recorded in the offset-time domain. For example, such data may be generated by a seismic survey shown schematically in FIG. 2.

Figure 2:
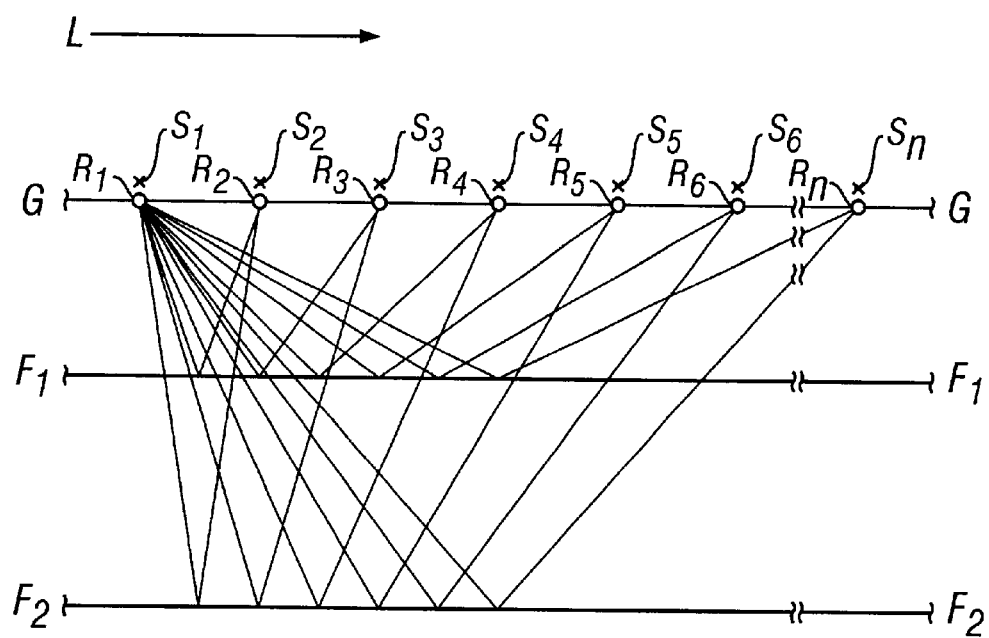
FIG. 2 is a schematic diagram of a two-dimensional seismic survey in which field records of seismic data are obtained at a number of seismic receivers along a profile of interest.

The seismic survey shown in FIG. 2 is a two-dimensional survey in offset-time (X-T) space along a seismic line of profile L. A number of seismic sources $S_n$ and receivers $R_n$ are laid out over a land surface G along profile L. The seismic sources $S_n$ are detonated in a predetermined sequence. As they are discharged, seismic energy is released as energy waves. The seismic energy waves or "signals" travel downward through the earth where they encounter subsurface geological formations, such as formations $F_1$ and $F_2$ shown schematically in FIG. 2. As they do, a portion of the signal is reflected back upwardly to the receivers $R_n$. The paths of such primary reflection signals from $S_1$ to the receivers $R_n$ are shown in FIG. 2.

The receivers $R_n$ sense the amplitude of incoming signals and digitally record the amplitude data over time for subsequent processing. Those amplitude data recordations are referred to as traces. It will be appreciated that the traces recorded by receivers $R_n$ include both primary reflection signals of interest, such as those shown in FIG. 2, and unwanted noise events.

It also should be understood that the seismic survey depicted schematically in FIG. 2 is a simplified one presented for illustrative purposes. Actual surveys typically include a considerably larger number of sources and receivers. Further, the survey may taken on land or over a body of water. The seismic sources usually are dynamite charges if the survey is being done on land, and geophones are used. Air guns are typically used for marine surveys along with hydrophones. The survey may also be a three-dimensional survey over a surface area of interest rather than a two-dimensional survey along a profile as shown.

Figure 3:
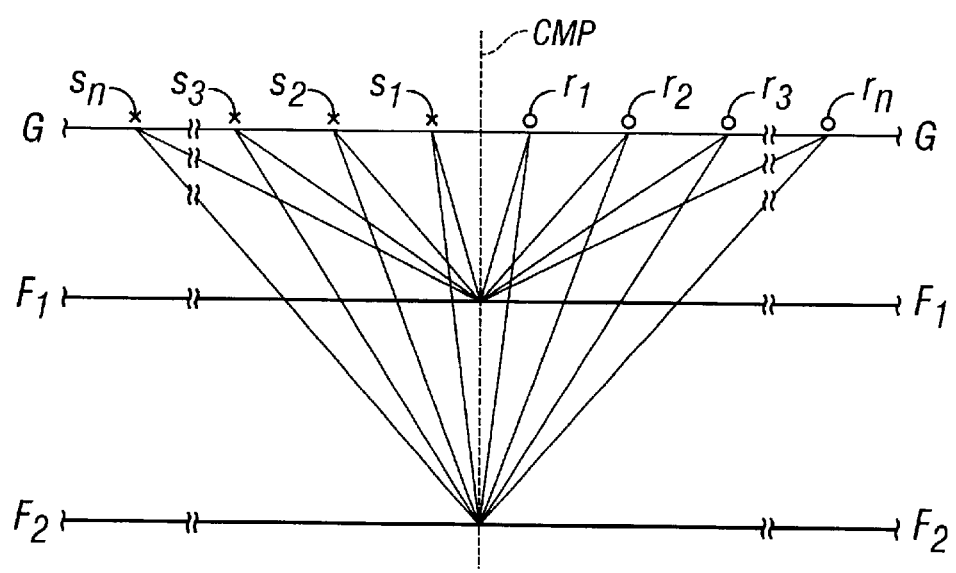
FIG. 3 is a schematic diagram of a seismic survey depicting a common midpoint geometry gather.

In accordance with the subject invention, the seismic data is assembled into common geometry gathers in an offset-time domain. For example, in step 2 of the preferred method of FIG. 1, the seismic amplitude data is assembled in the offset-time domain as a common midpoint gather. That is, as shown schematically in FIG. 3, midpoint CMP is located halfway between source $s_1$ and receiver $r_1$. Source $s_2$ and receiver $r_2$ share the same midpoint CMP, as do all pairs of sources $s_n$ and receivers $r_n$ in the survey. Thus, it will be appreciated that all source $s_n$ and receiver $r_n$ pairs are measuring single points on subsurface formations $F_n$. The traces from each receiver $r_n$ in those pairs are then assembled or "gathered" for processing.

It will be appreciated, however, that the other types of gathers are known by workers in the art and may be used in the subject invention. For example, the seismic data may be assembled into common source, common receiver, and common offset gathers and subsequently processed to enhance signal content and attenuate noise.

It also will be appreciated that the field data may be processed by other methods for other purposes before being processed in accordance with the subject invention as shown in step 3 of FIG. 1. For example, the data may be subjected to amplitude balancing and processed in accordance with the methods disclosed in U.S. Pat. No. 5,189,644 to Lawrence C. Wood and entitled "Removal of Amplitude Aliasing Effect From Seismic Data". The appropriateness of first subjecting the data to amplitude balancing or other conventional pre-processing, such as spherical divergence correction and absorption compensation, will depend on various geologic, geophysical, and other conditions well known to workers in the art. The methods of the subject invention may be applied to raw, unprocessed data or to data preprocessed by any number of well-known methods.

Transformation of Data

Once the data is assembled, the methods of the subject invention further comprise the steps of applying an offset weighting factor $x^n$ to the amplitude data to equalize amplitudes in the seismic data across offset values and to emphasize normal-moveout differences between desired reflection signals and unwanted noise, wherein $0<n<1$, and transforming the offset weighted amplitude data from the offset-time domain to the time-slowness domain using a Radon transformation.

For example, in step 4 of the exemplified method of FIG. 1, an offset weighting factor is applied to the data that was assembled in step 2. The offset weighted data is then transformed with a hyperbolic Radon transformation in step 5. It will be appreciated, however, that the Radon transformation of the offset weighted data may be may be based on linear slant stack, parabolic, or other non-hyperbolic kinematic travel time trajectories.

A general mathematical formulation utilizing the offset weighting factor and encompassing the linear, parabolic, and hyperbolic forward Radon transforms is as follows:

$$u(p, \tau) = \int_{-\infty}^{\infty} dx \int_{-\infty}^{\infty} dt\, d(x, t) x^n \delta[f(t, x, \tau, p)] \quad (1)$$

(forward transformation)
where
 $u(p, \tau)$=transform coefficient at slowness p and zero-offset time
 $\tau d(x, t)$=measured seismogram at offset x and two-way time t
 $x^n$=offset weighting factor ($0<n<1$)
 $\delta$=Dirac delta function
 $f(t, x, \tau, p)$=forward transform function The forward transform function for hyperbolic trajectories is as follows:

$$f(t, x, \tau, p) = t - \sqrt{\tau^2 + p^2 x^2}$$

Thus, when $t=\sqrt{\tau^2+p^2x^2}$, the forward hyperbolic Radon transformation equation becomes $$u(p, \tau) = \int_{-\infty}^{\infty} dx\, x^n d\left(x, \sqrt{t^2 + p^2 x^2}\right)$$

The forward transform function for linear slant stack kinematic trajectories is as follows:

$$f(t, x, \tau, p) = t - \tau - px$$

Thus, when $t=\tau+px$, the forward linear slant stack Radon transformation equation becomes $$u(p, \tau) = \int_{-\infty}^{\infty} dx\, x^n d(x, \tau + px)$$

The forward transform function for parabolic trajectories is as follows:

$$f(t, x, \tau, p) = t - px^2$$

Thus, when $t=\tau+px^2$, the forward parabolic Radon transformation equation becomes $$u(p, \tau) = \int_{-\infty}^{\infty} dx\, x^n d(x, \tau + px^2)$$

As with conventional Radon transformations, the function $f(t, x, \tau, p)$ allows kinematic travel time trajectories to include anisotropy, P-S converted waves, wave-field separations, and other applications of current industry that are used to refine the analysis consistent with conditions present in the survey area. Although hyperbolic travel time trajectories represent more accurately reflection events for common midpoint gathers in many formations, hyperbolic Radon transformations to date have not been widely used. Together with other calculations necessary to practice prior art processes, the computational intensity of hyperbolic Radon transforms tended to make such processing more expensive and less accurate. Hyperbolic Radon transformations, however, are preferred in the context of the subject invention because the computational efficiency of the novel processes allows them to take advantage of the higher degree of accuracy provided by hyperbolic travel time trajectories.

It will be noted, however, that the novel Radon transformations set forth above in Equation 1 differ from conventional Radon transformations in the application of an offset weighting factor $x^n$, where x is offset. The offset weighting factor emphasizes differences that exist at increasing offset, i.e., normal moveout differences between desired primary reflections and multiples, linear, and other noise whose time trajectories do not fit a defined kinematic function. Since the offset is weighted by a factor n that is positive, larger offsets receive preferentially larger weights. The power n is greater than zero, but less than 1. Preferably, n is approximately 0.5 since amplitudes seem to be preserved better at that value. While the power n appears to be robust and insensitive, it probably is data dependent to some degree.

As will be appreciated by workers in the art, execution of the transformation equations discussed above involve numerous calculations and, as a practical matter, must be executed by computers if they are to be applied to the processing of data as extensive as that contained in a typical seismic survey. Accordingly, the transformation equations, which are expressed above in a continuous form, preferably are translated into discrete transformation equations which approximate the solutions provided by continuous transformation equations and can be encoded into and executed by computers.

For example, assume a seismogram $d(x, t)$ contains $2L+1$ traces each having N time samples, i.e., $l = 0, \pm 1, \ldots, \pm L$ and $k = 1, \ldots, N$ and that $x_{-L} < x_{-L+1} < \ldots < x_{L-1} < x_L$ A discrete general transform equation approximating the continuous general transform Equation 1 set forth above, therefore, may be derived as set forth below:

$$u(p, \tau) = \sum_{l=-L}^{L} \sum_{k=1}^{N} d(x_l, t_k) x_l^n \delta[f(t_k, x_l, \tau, p)] \Delta x_l \Delta t_k \quad (2)$$

where $\Delta x_l = \dfrac{x_{l+1} - x_{l-1}}{2}$ for $l = 0, \pm 1, \ldots, \pm (L-1)$ $\Delta x_L = x_L - x_{L-1}$ $\Delta x_{-L} = x_{-L+1} - x_{-L}$ $\Delta t_k = \dfrac{t_{k+1} - t_{k-1}}{2}$ for $k = 2, \ldots, N-1$ $\Delta t_1 = t_2 - t_1$ $\Delta t_N = t_N - t_{N-1}$ By substituting the hyperbolic forward transform function set forth above, the discrete general forward transformation Equation 2 above, when $t = \sqrt{\tau^2 + p^2 x^2}$, may be reduced to the discrete transformation based on hyperbolic kinematic travel time trajectories that is set forth below:

$$u(p, \tau) = \sum_{l=-L}^{L} x_l^n d\left(x_l, \sqrt{\tau^2 + p^2 x_l^2}\right) \Delta x_l$$

Similarly, when $t = \tau + px$, the discrete linear slant stack forward transformation derived from general Equation 2 is as follows:

$$u(p, \tau) = \sum_{l=-L}^{L} x_l^n d(x_l, \tau + px_l) \Delta x_l$$

When $t = \tau + px^2$, the discrete parabolic forward transformation is as follows:

$$u(p, \tau) = \sum_{l=-L}^{L} x_l^n d(x_l, \tau + px_l^2) \Delta x_l$$

Those skilled in the art will appreciate that the foregoing discrete transformation Equation 2 sufficiently approximates continuous Equation 1, but still may be executed by computers in a relatively efficient manner. For that reason, the foregoing equation and the specific cases derived therefrom are preferred, but it is believed that other discrete transformation equations based on Radon transformations are known, and still others may be devised by workers of ordinary skill for use in the subject invention Filtering of Data The methods of the subject invention further comprise the step of applying a corrective filter to enhance the primary reflection signal content of the data and to eliminate unwanted noise events. Preferably, the corrective filter is determined by performing a semblance analysis on the amplitude data to generate a semblance plot and performing a velocity analysis on the semblance plot to define a stacking velocity function and the corrective filter.

For example, in step 6 of the preferred method of FIG. 1, a semblance analysis is performed on the offset weighted amplitude data to generate a semblance plot. Then, in step 7 a velocity analysis is performed on the semblance plot to define a stacking velocity function and a corrective filter. The corrective filter then is applied to the transformed data as shown in step 8.

When the semblance analysis is performed on amplitude data that has been offset weighted, as described above, the resulting velocity analysis will be more accurate and, therefore, a more effective filter may be defined. It will be appreciated, however, that the semblance analysis may be performed on data that has not been offset weighted. Significant improvements in accuracy and computational efficiency still will be achieved by the subject invention.

The design of a corrective filter is guided by the following principles. Seismic waves can be analyzed in terms of plane wave components whose arrival times in X-T space are linear. Seismic reflection times are approximately hyperbolic as a function of group offset X in the following relations:

$$t_x^2 = t_o^2 + \dfrac{x^2}{v_s^2}$$

where x is the group offset, $t_x$ is the reflection time at offset x;

$t_o$ is the reflection time at zero offset; and $v_s$ is the stacking velocity.

The apparent surface velocity of a reflection at any given offset relates to the slope of the hyperbola at that offset. Those slopes, and thus, the apparent velocities of reflections are bounded between infinite velocity at zero offset and the stacking velocity at infinite offset. Noise components, however, range from infinite apparent velocity to about one-half the speed of sound in air.

Impulse responses for each Radon transform can be readily calculated by setting $g(t, x, \tau_1, p_1) = 0$ or $f(t_1, x_1, \tau, p) = 0$ in the respective domains, for example, by substituting a single point sample such as $(x_1, t_1)$ or $(\tau_1, p_1)$ in each domain. Substituting $d(x_1, t_1) = A\delta(x - x_1)\delta(t - t_1)$ into the linear slant stack equation yields $u(p, \tau) = A\delta(t_1 - \tau px_1)$.

Thus it shows that a point of amplitude A at $(x_1, t_1)$ maps into the straight line $$\tau + p x_1 = t_1.$$

On the other hand, substituting $(p_1, \tau_1)$ of amplitude B yields $$u(p, \tau) = B\delta(\tau_1 - t + p_1 x)$$

showing that a point $(p_1, \tau_1)$ in TA U-P space maps into the line $$\tau_1 = t - p_1 x.$$

In a similar manner it can be shown that a hyperbola $$t^2 = t_1^2 + \frac{x^2}{v^2}$$

maps into the point $$(\tau, p) = (t_1, 1/v),$$

and vice-versa.

In the practice of the subject invention a point $(x_1, t_1)$ maps into the ellipse $$1 = \frac{\tau^2}{t_1^2} + \frac{p^2 x_1^2}{t_1^2}$$

(X-T domain impulse response) under the hyperbolic Radon transform. Thus, hyperbolas representing signals map into points.

In addition straight lines $$t = mx$$

representing organized source-generated noise also map into points $$(\tau, p) = (o, m)$$

in the TAU-P domain. These properties form the basis for designing TAU-P filters that pass signal and reject noise in all common geometry domains.

In summary then, in a common midpoint gather prior to NMO correction, the present invention preserves the points in TAU-P space corresponding to the hyperbolas described by the stacking velocity function $(t_1, v)$, where $v$ is the dip corrected stacking velocity. A suitable error of tolerance such as 5–20% is allowed for the stacking velocity function. Similar procedures exist for each of the other gather geometries.

The signal's characterization is defined by the Canonical equations that are used to design two and three dimensional filters in each common geometry gather. Filters designed to pass signal in the TAU-P domain for the common geometry gathers for both two-and-three dimensional seismic data are derived from the following basic considerations. In the X-T domain the kinematic travel time for a primary reflection event's signal in a common midpoint ("CMP") gather is given by the previously described hyperbolic relationship $$t_x^2 = t_o^2 + \frac{x^2}{v_s^2}$$

Under the hyperbolic Radon transformation, this equation becomes $$t_x^2 = \tau^2 + p^2 x^2.$$

The source coordinate for two-dimensional seismic data may be denoted by I (Initiation) and the receiver coordinate by R (receiver) where $\tau = t_o$ and $p = 1/v_s$. The signal slowness in the TAU-P domain for common source data is given by $$\frac{\partial t_x}{\partial R}\bigg|_{I=I_o} = \frac{\partial t_x \partial C}{\partial C \partial R} + \frac{\partial t \partial x}{\partial x \partial R}$$

where the CMP coordinate (C) and offset (x) are as follows:

$$C = \frac{I + R}{2}$$

$$x = R - I$$

Defining common source slowness $(p_R)$, common offset slowness $(p_C)$, and common midpoint slowness $(p_x)$ as follows:

$$p_R = \frac{\partial t_x}{\partial R}\bigg|_I$$

$$p_C = \frac{\partial t_x}{\partial C}\bigg|_x$$

$$p_x = \frac{\partial t_x}{\partial x}\bigg|_C$$

we obtain a general (canonical) relationship for signal slowness in the TAU-P domain:

$$p_R = \tfrac{1}{2} p_C + p_x$$

Common offset slowness $p_C$ is given by $$p_C = \frac{\partial t_x \partial t_o}{\partial t_o \partial C} = \frac{\partial t_x}{\partial t_o} p_o$$

where $p_o$ is the slowness or "dip" on the CMP section as given by $$p_o = \frac{\partial t_o}{\partial C}$$

Since $$t_x^2 = t_o^2 + \frac{x^2}{v_s^2},$$

we obtain $$\frac{\partial t_x}{\partial t_o} = \frac{t_o}{t_x} - \frac{x^2 a}{t_x v_s^3},$$

where acceleration (a)

$$a = \frac{\partial v_s}{\partial t_o}.$$

Thus, we obtain that common offset slowness ($p_C$)

$$p_C = p_o \frac{t_o}{t_x}\left(1 - \frac{ax^2}{t_o v_s^3}\right).$$

Under a hyperbolic Radon transformation where $$\tau = t_o$$

$$t_x = \sqrt{\tau^2 + p^2 x^2},$$

we determine that the common midpoint slowness ($p_x$), common source slowness ($p_R$), common receiver slowness ($p_I$), and common offset slowness ($p_C$) may be defined as follows:

$$p_x = \frac{x}{v_s^2 \sqrt{\tau^2 + p^2 x^2}}$$

$$p_R = \frac{1}{2} p_C + p_x$$

$$p_I = \frac{1}{2} p_C - p_x$$

$$p_C = p_o \frac{\tau}{\sqrt{\tau^2 + p^2 x^2}}\left(1 - \frac{ax^2}{t_o v_s^3}\right)$$

In common source, receiver and offset gathers, the pass regions or filters in TAU-P space are defined as those slowness (p's) not exceeding specified percentages of slownesses $p_R$, $p_I$, and $P_C$, respectively:

$$p \leq \left(\frac{1}{1+r_3}\right) p_R \quad \text{(common source)}$$

$$p \leq \left(\frac{1}{1+r_4}\right) p_I \quad \text{(common receiver)}$$

$$p \leq \left(\frac{1}{1+r_5}\right) p_C \quad \text{(common offset)}$$

where $r_3$, $r_4$, and $r_5$ are percentages expressed as decimals. Slownesses $p_R$, $P_I$, and $p_C$ are expressed, respectively, as follows:

$$p_R = \frac{1}{2} p_C + p_x \quad \text{(common source)}$$

$$p_I = \frac{1}{2} p_C - p_x \quad \text{(common receiver)}$$

$$p_C = \frac{t_o}{t_x} p_x \left(1 - \frac{ax^2}{t_o v_s^3}\right) \quad \text{(common offset)}$$

where $$p_x = \frac{x}{t_x v_s^2}$$

$$a = \frac{\partial v_s}{\partial t_o} \quad \text{(velocity acceleration)}$$

-continued $$p_o = \frac{\partial t_o}{\partial C} \quad \text{(dip on CMP stack)}$$

$$t_X = \sqrt{t_o^2 + \frac{x^2}{v_s^2}}$$

$$\tau = t_o$$

The value for offset x in these equations is the worse case maximum offset determined by the mute function.

Inverse Transforming the Data

After the corrective filter is applied, the methods of the subject invention further (comprise the steps of inverse transforming the enhanced signal content from the time-slowness domain back to the offset-time domain using an inverse Radon transformation and applying an inverse of the offset weighting factor $p^n$ to the inverse transformed data, thereby restoring the signal amplitude data for the enhanced signal content. For example, in step 9 of the method of FIG. 1, an inverse hyperbolic Radon transformation is used to inverse transform the enhanced signal from the time-slowness domain back to the offset-time domain. An inverse of the offset weighting factor $p^n$ then is applied to the inverse transformed data, as shown in step 10. The signal amplitude data for the enhanced signal content is thereby restored.

A general mathematical formulation utilizing the inverse offset weighting factor and encompassing the linear, parabolic, and hyperbolic inverse Radon transforms is as follows:

$$d(x, t) = \int_{-\infty}^{\infty} dp \int_{-\infty}^{\infty} d\tau p^n \rho(\tau)^* u(p, \tau) \delta[g(t, x, \tau, p)] \quad (3)$$

(inverse transformation)
where u(p, τ)=transform coefficient at slowness p and zero-offset time τd(x, t)=measured seismogram at offset x and two-way time t $p^n$=inverse offset weighting factor (0<n<1)

ρ(τ)*=convolution of rho filter

δ=Dirac delta function g(t, x, τ, p)=inverse transform function
The inverse transform function for hyperbolic trajectories is as follows:

$$g(t, x, \tau, p) = \tau - \sqrt{t^2 - p^2 x^2}$$

Thus, when $\tau = \sqrt{t^2 - p^2 x^2}$, the inverse hyperbolic Radon transformation equation become;

$$d(x, t) = \int_{-\infty}^{\infty} dp\, p^n \rho(\tau)^* u\left(p, \sqrt{t^2 - p^2 x^2}\right)$$

The inverse transform function for linear slant stack trajectories is as follows:

$$g(t, x, \tau, p) = \tau - t + px$$

Thus, when τ=t−px, the inverse linear slant stack Radon transformation equation becomes $$d(x, t) = \int_{-\infty}^{\infty} d\!p\, p^n \rho(\tau)^* u(p, t - px)$$

the inverse transform function for parabolic trajectories is as follows:

$$g(t,\, x,\, \tau, p) = \tau - t + px^2$$

Thus, when τ=t−px², the inverse parabolic Radon transformation equation becomes $$d(x, t) = \int_{-\infty}^{\infty} d\!p\, p^n \rho(\tau)^* u(p, t - px^2)$$

As with the forward transform function $f(t, x, \tau, p)$ in conventional Radon transformations, the inverse travel-time function $g(t, x, \tau, p)$ allows kinematic travel time trajectories to include anisotropy, P-S converted waves, wave-field separations, and other applications of current industry that are used to refine the analysis consistent with conditions present in the survey area. It will be noted, however, that the novel inverse Radon transformations set forth above in Equation 3 differ from conventional inverse Radon transformations in the application of an inverse offset weighting factor $p^n$, where p is slowness.

The inverse offset weighting factor restores the original amplitude data which now contains enhanced primary reflection signals and attenuated noise signals. Accordingly, smaller offsets receive preferentially larger weights since they received preferentially less weighting prior to filtering. The power n is greater than zero, but less than 1. Preferably, n is approximately 0.5 because amplitudes seem to be preserved better at that value. While the power n appears to be robust and insensitive, it probably is data dependent to some degree.

As discussed above relative to the forward transformations, the continuous inverse transformations set forth above preferably are translated into discrete transformation equations which approximate the solutions provided by continuous transformation equations and can be encoded into and executed by computers.

For example, assume a transform coefficient $u(p, \tau)$ contains 2J+1 discrete values of the parameter p and M discrete values of the parameter τ, ie., $$j = 0, \pm 1, \ldots, \pm J \text{ and}$$

$$m = 1, \ldots, M$$

and that $$p_{-J} < p_{-J-1} < \ldots < p_{J-1} < p_J$$

A discrete general transform equation approximating the continuous general transform Equation 3 set forth above, therefore, may be derived as set forth below:

$$d(x, t) = \sum_{j=-J}^{J} \sum_{m=1}^{M} u(p_j, \tau_m) p_j^n \rho(\tau)^* \delta[g(t, x, \tau_m, p)] \Delta p_j \Delta \tau_m \tag{4}$$

where $$\Delta p_j = \frac{p_{j+1} - p_{j-1}}{2} \text{ for } j = 0, \pm 1, \ldots, \pm(J-1)$$

$$\Delta p_J = p_J - p_{J-1}$$

$$\Delta p_{-J} = p_{-J+1} - p_{-J}$$

$$\Delta \tau_m = \frac{\tau_{m+1} - \tau_{m-1}}{2} \text{ for } m = 2, \ldots, M-1$$

$$\Delta \tau_1 = \tau_2 - \tau_1$$

$$\Delta \tau_M = \tau_M - \tau_{M-1}$$

By substituting the hyperbolic inverse transform function set forth above, the discrete general inverse transformation Equation 4 above, when $\tau = \sqrt{t^2 - p^2 x^2}$, may be reduced to the discrete inverse transformation based on hyperbolic kinematic travel time trajectories that is set forth below:

$$d(x, t) = \sum_{j=-J}^{J} p_j^n \rho(\tau)^* u\!\left(p_j,\, \sqrt{t^2 - p_j^2 x^2}\,\right) \Delta p_j$$

Similarly, when τ=t−px, the discrete linear slant stack inverse transformation derived from the general Equation 4 is as follows:

$$d(x, t) = \sum_{j=-J}^{J} p_j^n \rho(\tau)^* u(p_j, t - p_j x) \Delta p_j$$

When τ=t−px², the discrete parabolic inverse transformation is as follows:

$$d(x, t) = \sum_{j=-J}^{J} p_j^n \rho(\tau)^* u(p_l, t - p_j x^2) \Delta p_j$$

Those skilled in the art will appreciate that the foregoing inverse transformation Equations 3 and 4 are not exact inverses of the forward transformation Equations 1 and 2. They are sufficiently accurate, however, and as compared to more exact inverse equations, they are less complicated and involve fewer mathematical computations. For example, more precise inverse transformations could be formulated with Fourier transform equations, but such equations require an extremely large number of computations to execute. For that reason, the foregoing equations are preferred, but it is believed that other inverse transformation equations are known, and still others may be devised by workers of ordinary skill for use in the subject invention.

The transformations and semblance analyses described above, as will be appreciated by those skilled in the art, are performed by sampling the data according to sampling variables Δt, Δx, Δτ, and Δp. The sampling variables Δt, Δτ, and Δp used in prior art methods, because those methods typically involve more steps along with complex equations associated with normal moveout correction, are relatively large. Industry typically samples at Δt values several time greater than that at which the field data was recorded, i.e., with NMO correction, in the range of 20–40 milliseconds, effectively discarding much of the data. Δp is typically set at values in the range of 4–24 μsec/m. The distance between receivers in a survey, Δx, will vary, but typically is from about 25 meters to 400 meters or more. Certain prior art processes utilize trace interpolation, thereby nominally reducing Δx values, but the additional "data" is an approximation of what would be recorded at a particular offsets between the offsets where receivers were actually located. Accordingly, prior art processes, because they rely on operations that are more complex and involve a greater number of steps, operate on a lesser number of data points. That is, they are relatively coarse and, for that reason, relatively inaccurate.

In contrast, because the novel methods do not require normal moveout correction prior to transformation or a least mean square analysis, sampling variables may be much finer. Specifically, Δt and Δτ may be set as low as the sampling rate at which the data was collected, which is typically 1 to 4 milliseconds, or even lower if lower sampling rates are used. Δp values as small as about 0.5 μsec/m may be used. Preferably, Δp is from about 0.5 to 4.0 μsec/m, or from about 0.5 to about 2.0 μsec/m. Most preferably Δp is set at 1.0 μsec/m Since the sampling variables are finer, the calculations are more precise. It is preferred, therefore, that the sampling variables Δt, Δx, and Δτ be set at the corresponding sampling rates for the seismic data field records and that Δp be set at 1 μsec/m. In that manner, all of the data recorded by the receivers is processed. It also is not necessary to interpolate between measured offsets.

Moreover, the increase in accuracy achieved by using finer sampling variables in the novel processes is possible without a significant increase in computation time or resources. Although the novel transformation equations and offset weighting factors may be operating on a larger number of data sets, those operations require fewer computations that prior art process. On the other hand, coarser sampling variables more typical of prior art processes may be used in the novel process, and they will yield accuracy comparable to that of the prior art, but with significantly less computational time and resources.

For example, industry commonly utilizes a process known as constant velocity stack (CVS) panels that in some respects is similar to processes of the subject invention. CVS panels and the subject invention both are implemented on common mid-point gathers prior to common mid-point stacking and before normal moveout (NMO) correction. Thus, the starting point of both processes is the same.

In the processes of the subject invention, the discrete hyperbolic radon transform u(p, τ) is calculated by summing seismic trace amplitudes d(x, t) along a hyperbolic trajectory $$t=\sqrt{\tau^2+p^2x^2}$$

in offset-time (x, t) space for a particular tau-p (τ, p) parameter selection. Amplitudes d(x, t) are weighted according to a power n of the offset x, i.e., by the offset weighting factor $x^n$. The summation and weighting process is described by the discrete forward transform Equation 2. In comparison, a CVS panel does not apply any offset dependent weighting.

In the processes of the subject invention, the calculation consists of first scanning over all desired zero-offset times τ for a given specification of p, and then changing the value of p and repeating the x-t summation for all desired taus (τ's). Thus, all desired values of τ and p are accounted for in the summations described by Equation 2 above.

A given choice of p describes a family of hyperbolas over the common midpoint gather's x-t space. A fixed value of p is equivalent to fixing the stacking velocity $V_s$ since p is defined as its reciprocal, viz., $p=1/V_s$. By varying the zero-offset time τ over the desired τ-scan range for a fixed value of $p=1/V_s$, seismic amplitudes are summed in x-t space over a family of constant velocity hyperbolic trajectories.

Thus, the novel Radon transforms u(p, τ) can be thought of as successively summing amplitudes over constant velocity hyperbolic time trajectories that have not been corrected for normal moveout (NMO).

In constructing a CVS panel the starting point is a common midpoint gather. As in the case of the novel processes, successive scans over stacking velocity $V_s$ and zero-offset time $T_o$ are implemented for hyperbolic trajectories defined by the equation $$t=\sqrt{T_o^2\frac{x^2}{v_s^2}}$$

The equivalence of $T_o=\tau$ and $p=1/V_s$ in defining the same families of hyperbolas is obvious. The difference between the novel processes and CVS is in the implementation of amplitude summations. In both cases, a $V_s=1/p$ is first held constant, and the $T_o=\tau$ is varied. A new $V_s=1/p$ is then held constant, and the $T_o=\tau$ scan repeated. In this manner, the same families of hyperbolas are defined. However, an NMO correction is applied to all the hyperbolas defined by the $V_s=1/p$ choice prior to summing amplitudes. A CVS trace is calculated for each constant velocity iteration by first NMO correcting the traces in the common midpoint gather and then stacking (i.e., summing) the NMO corrected traces. Thus, one CVS trace in a CVS panel is almost identical to a u(p=constant,τ) trace in the novel processes. The difference lies in whether amplitudes are summed along hyperbolic trajectories without an NMO correction as in the novel process or summed (stacked) after NMO correction.

The novel processes and CVS differ in the interpolations required to estimate seismic amplitudes lying between sample values. In the novel processes amplitude interpolations occur along hyperbolic trajectories that have not been NMO corrected. In the CVS procedure amplitude interpolation is an inherent part of the NMO correction step. The novel processes and CVS both sum over offset x and time t after interpolation to produce a time trace where $p=1/V_s$ is held constant over time $T_o=\tau$. Assuming interpolation procedures are equivalent or very close, then a single CVS time trace computed from a particular common midpoint gather with a constant $V_s=1/p$ is equivalent in the novel processes to a time trace u(p, τ) where $p=1/V_s$ is held constant. Thus, in actual practice the velocity ensemble of CVS traces for a single common midpoint gather corresponds to a coarsely sampled transformation of the same common midpoint gather according to the novel processes. As noted, however, the novel processes are capable of using finer sampling variables and thereby of providing greater accuracy.

Refining of the Stacking Velocity Function

The subject invention also encompasses improved methods for determining a stacking velocity function which may be used in processing seismic data. Such improved methods comprise the steps of performing a semblance analysis on the restored data to generate a second semblance plot. Though not essential, preferably an offset weighting factor $x^n$, where 0<n<1, is first applied to the restored data. A velocity analysis is then performed on the second semblance plot to define a second stacking velocity function. It will be appreciated that this second stacking velocity, because it has been determined based on data processed in accordance with the subject invention, more accurately reflects the true stacking velocity function and, therefore, that inferred depths and compositions of geological formations and any other subsequent processing of the data that utilizes a stacking velocity function are more accurately determined.

For example, as shown in step 11 of FIG. 1, an offset weighting factor $x^n$ is applied to the data that was restored in step 10. A semblance plot is then generated from the offset weighted data as shown in step 12. The semblance plot is used to determine a stacking velocity function in step 13 which then can be used in further processing as in step 14. Though not shown on FIG. 1, it will be appreciated that the semblance analysis can be performed on the inverse transformed data from step 9, thereby effectively applying an offset weighting factor since the effect of offset weighting the data prior to transformation has not been inversed.

Display and Further Processing of Data

After the data is restored, it may be displayed for analysis, for example, as shown in step 15 of FIG. 1. The restored data, as discussed above, may be used to more accurately define a stacking velocity function. It also may subject to further processing before analysis as shown in step 16. Such processes may include pre-stack time or depth migration, frequency-wave number filtering, other amplitude balancing methods, removal of aliasing effects, seismic attribute analysis, spiking deconvolution, data stack processing, and other methods known to workers in the art. The appropriateness of such further processing will depend on various geologic, geophysical, and other conditions well known to workers in the art.

Invariably, however, the data in the gather, after it has been processed and filtered in accordance with the subject invention, will be stacked together with other data gathers in the survey that have been similarly processed and filtered. The stacked data is then used to make inference about the subsurface geology in the survey area.

The methods of the subject invention preferably are implemented by computers and other conventional data processing equipment. Suitable software for doing so may be written in accordance with the disclosure herein. Such software also may be designed to process the data by additional methods outside the scope of, but complimentary to the novel methods. Accordingly, it will be appreciated that suitable software will include a multitude of discrete commands and operations that may combine or overlap with the steps as described herein. Thus, the precise structure or logic of the software may be varied considerably while still executing the novel processes.

EXAMPLES

The invention and its advantages may be further understood by reference to the following examples. It will be appreciated, however, that the invention is not limited thereto.

Example 1

Model Data

Figure 4:
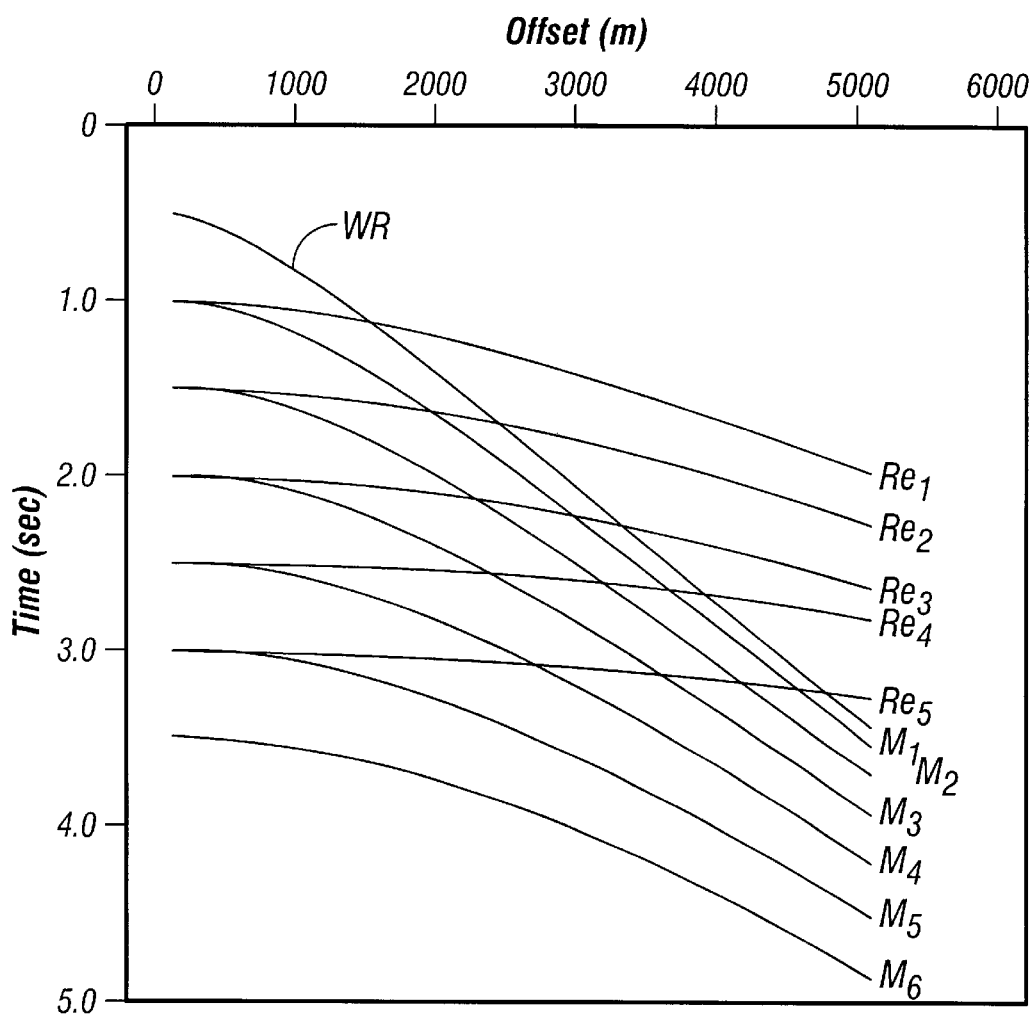
FIG. 4 is a plot or display of model seismic data in the offset-time domain of a common midpoint gather containing overlapping primary reflections, a water-bottom reflection, and undesired multiple reflections.

Seismic data was modeled in accordance with conventional considerations and plotted in the offset-time domain as shown in FIG. 4. Such data displays a common midpoint gather which includes desired primary reflections $Re_n$ and undesired multiples reflections $M_n$ beginning at 1.0, 1.5, 2.0, 2.5, 3.0 and 3.5 seconds. It also includes a desired water-bottom reflection WR at 0.5 seconds. It will be noted in particular that the signals for the desired reflections $Re_n$ and WR overlap with those of the undesired multiple reflections $M_n$.

Figure 5:
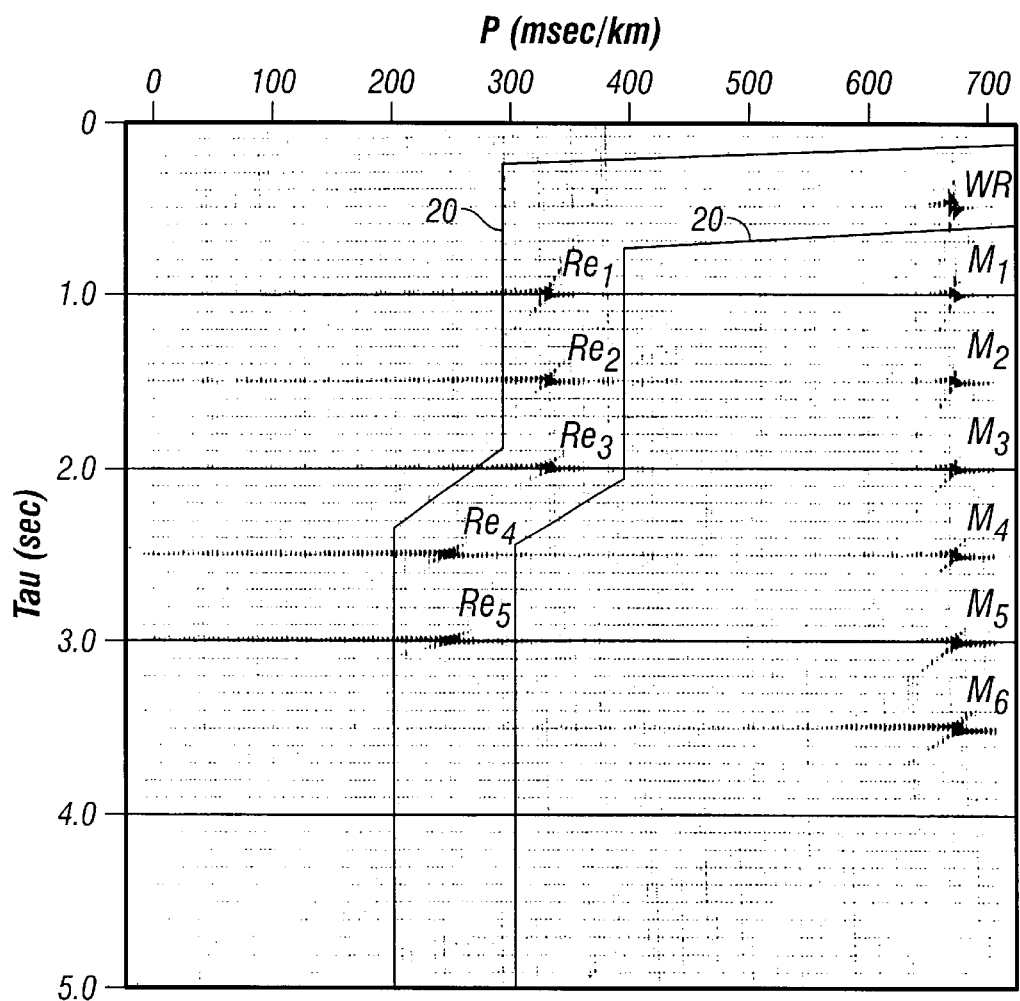
FIG. 5 is a plot of the model seismic data of FIG. 4 after transformation to the time-slowness domain using a novel hyperbolic Radon transform of the subject invention that shows the separation of primary and water-bottom reflections from multiple reflections.
Figure 6:
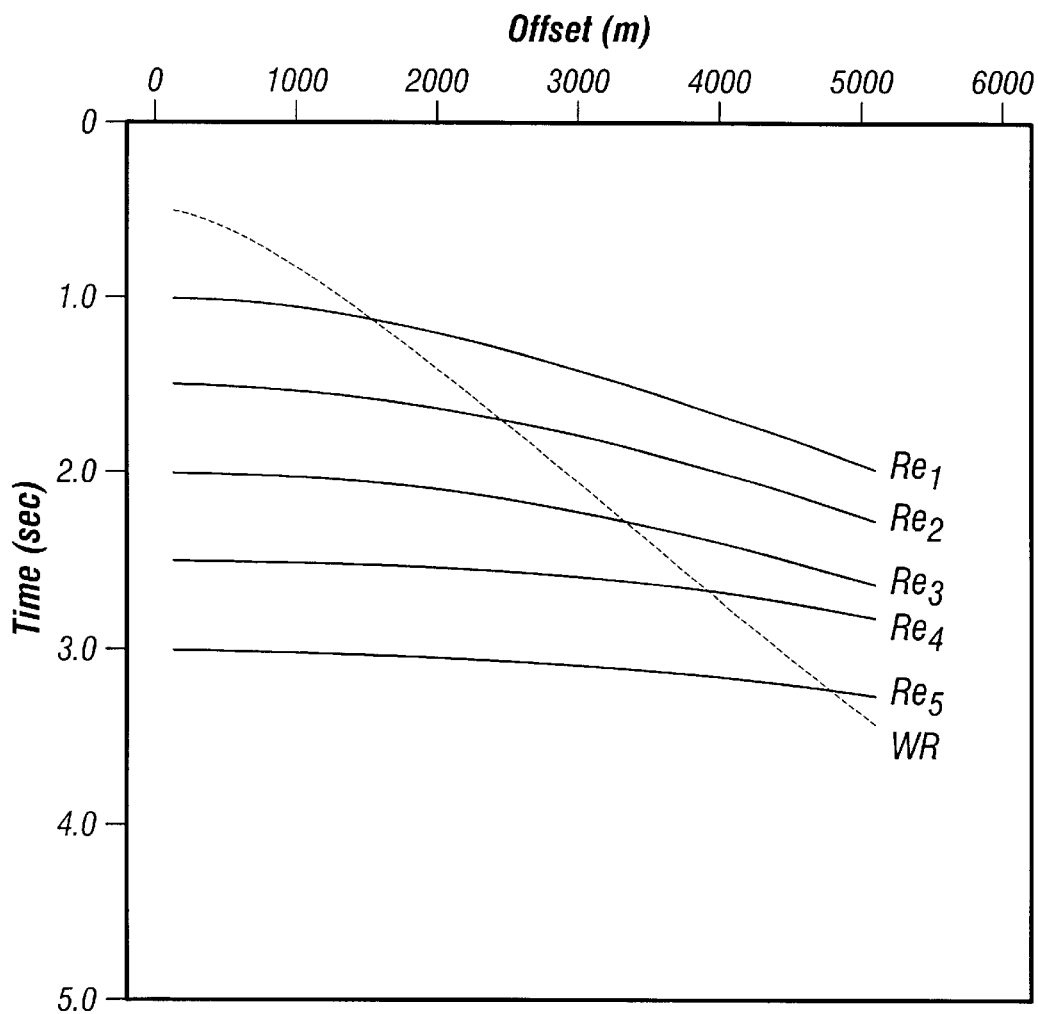
FIG. 6 is a plot or display in the offset-time domain of the model seismic data of FIG. 4 after applying a filter in the time-slowness domain and inverse transforming the filtered data that shows the retention of primary and water-bottom reflections and the elimination of multiple reflections.

The modeled seismic data was then transformed into the time-slowness domain utilizing a hyperbolic Radon transformation of the subject invention and an offset weighting factor $x^{0.5}$. As shown in FIG. 5, the reflections $Re_n$, WR, and $M_n$ all map to concentrated point-like clusters in time-slowness space. Those points, however, map to different areas of time-slowness space, and thus, the points corresponding to undesired multiple reflections $M_n$ can be eliminated by appropriate time-slowness filters, such as the filter represented graphically by lines 20. Thus, when the model data is inverse transformed back to the offset-time domain by a novel hyperbolic Radon inverse transformation, as shown in FIG. 6, only the desired primary reflections $Re_n$ and the water-bottom reflection WR are retained.

Example 2

West Texas Production Area

Figure 7:
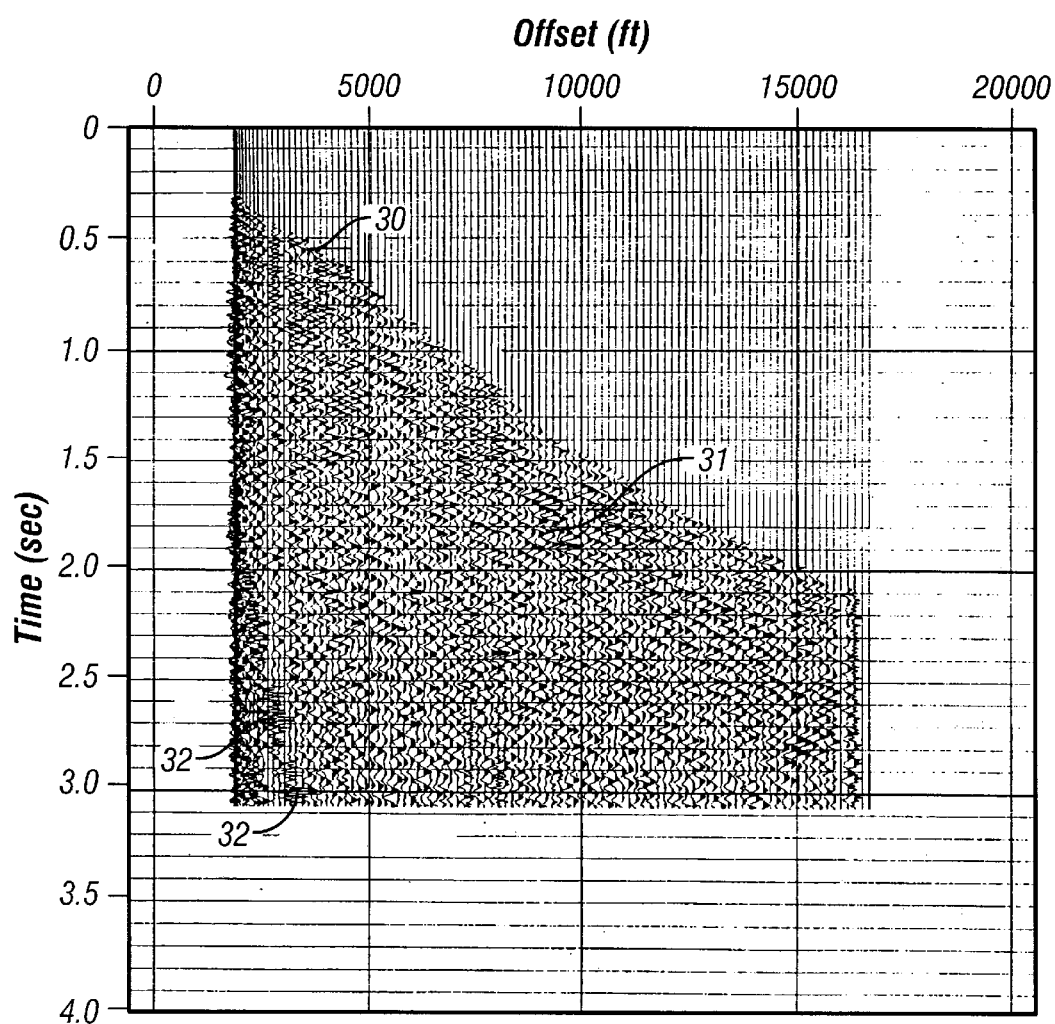
FIG. 7 is a plot in the offset-time domain of field records of seismic data recorded along a two-dimensional profile line in the West Texas region of the United States and assembled in a common midpoint geometry gather.

A seismic survey was done in the West Texas area of the United States. FIG. 7 shows a portion of the data collected along a two-dimensional survey line. It is displayed in the offset-time domain and has been gathered into a common midpoint geometry. It will be noted that the data includes a significant amount of unwanted noise, including muted refractions appearing generally in an area 30, aliased ground roll occurring in area 31, and apparent air wave effects at areas 32.

In accordance with the subject invention, a conventional semblance analysis was performed on the data. The semblance plot was then used to identify a stacking velocity function and, based thereon, to define a filter that would preserve primary reflection events and eliminate noise.

The data of FIG. 7 was also transformed into the time-slowness domain with a hyperbolic Radon transformation of the subject invention using an offset weighting factor $x^{0.5}$. A filter defined through the semblance analysis was applied to the transformed data, and the data was transformed back into the offset-time domain using a hyperbolic Radon inverse transform and an inverse of the offset weighting factor $p^{0.5}$. The data then was displayed, which display is shown in FIG. 8.

Figure 8:
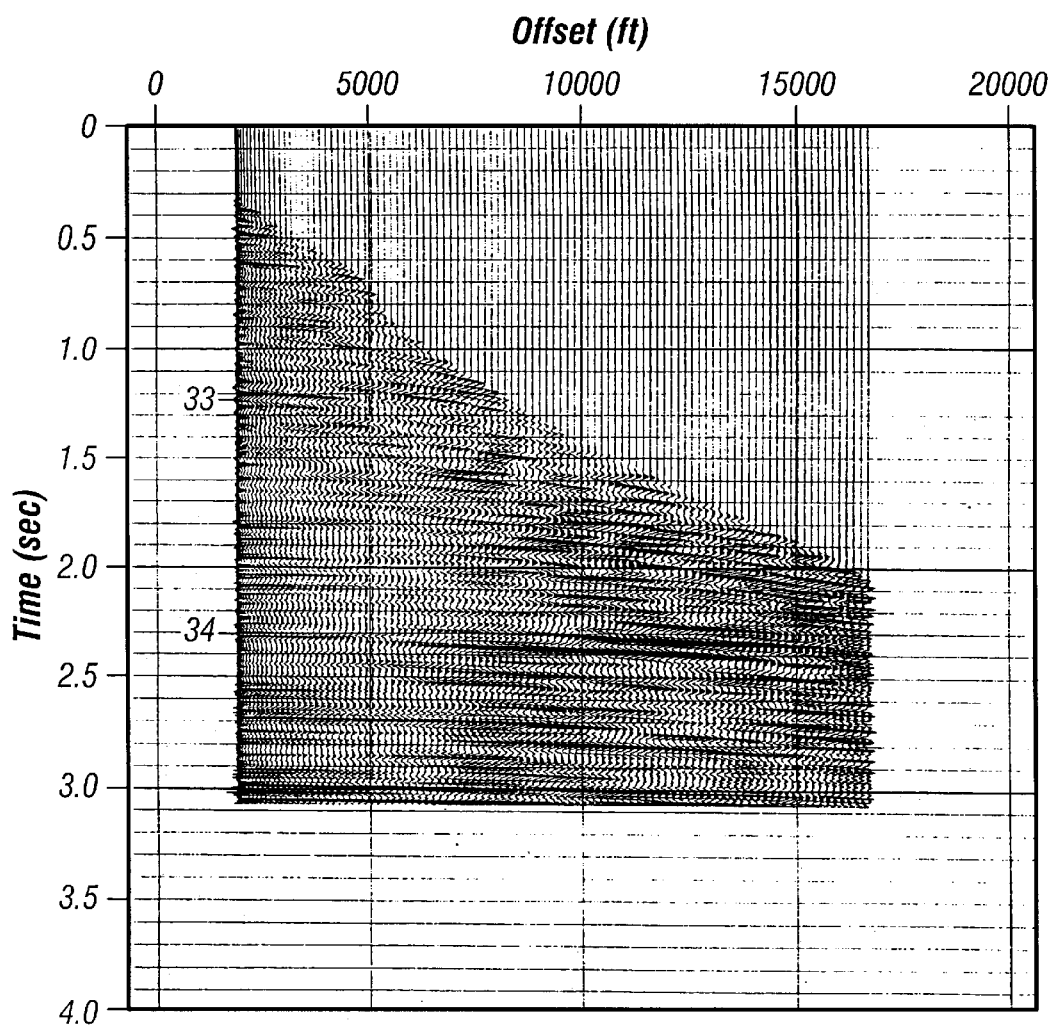
FIG. 8 is a plot in the offset-time domain of the seismic data of FIG. 7 after having been processed and filtered in accordance with the subject invention.

In FIG. 8, seismic reflection signals appear as hyperbolas, such as those indicated at 33 and 34 (troughs). It will be noted that the unwanted noise that was present in the unprocessed data of FIG. 7 as muted refractions 30, aliased ground roll 31, and air wave effects 32 is no longer present in the processed display of FIG. 8.

Figure 9:
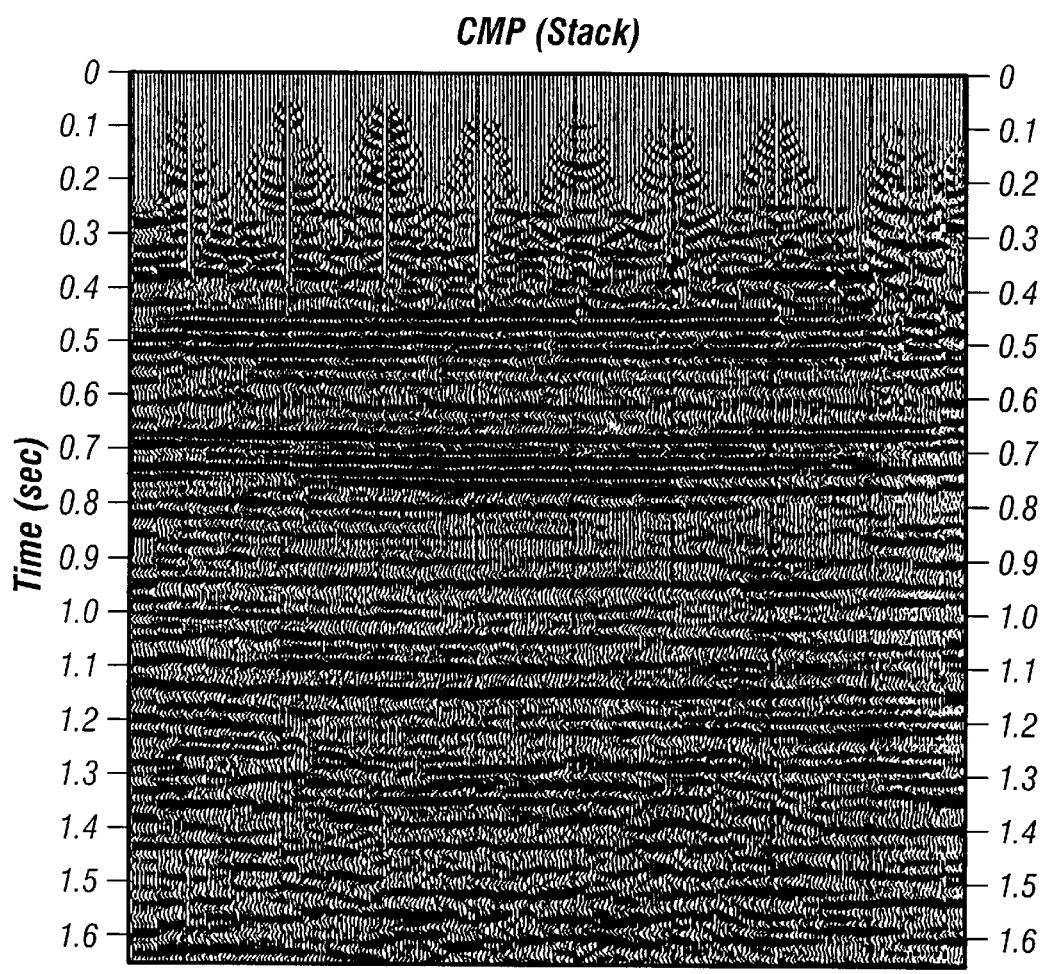
FIG. 9 is a plot in the offset-time domain of data processed and filtered according to the subject invention, including the data of FIG. 8, that have been stacked in accordance with industry practices.

The data of FIG. 8 was then stacked along with other processed and filtered CMP gathers from the survey in accordance with industry practice. A plot of the stacked data is shown in FIG. 9. Seismic reflection signals appear as horizontal lines, e.g., those lines appearing at approximately 0.45 sec and 1.12 sec, from which the depth of geological formations may be inferred.

Figure 10:
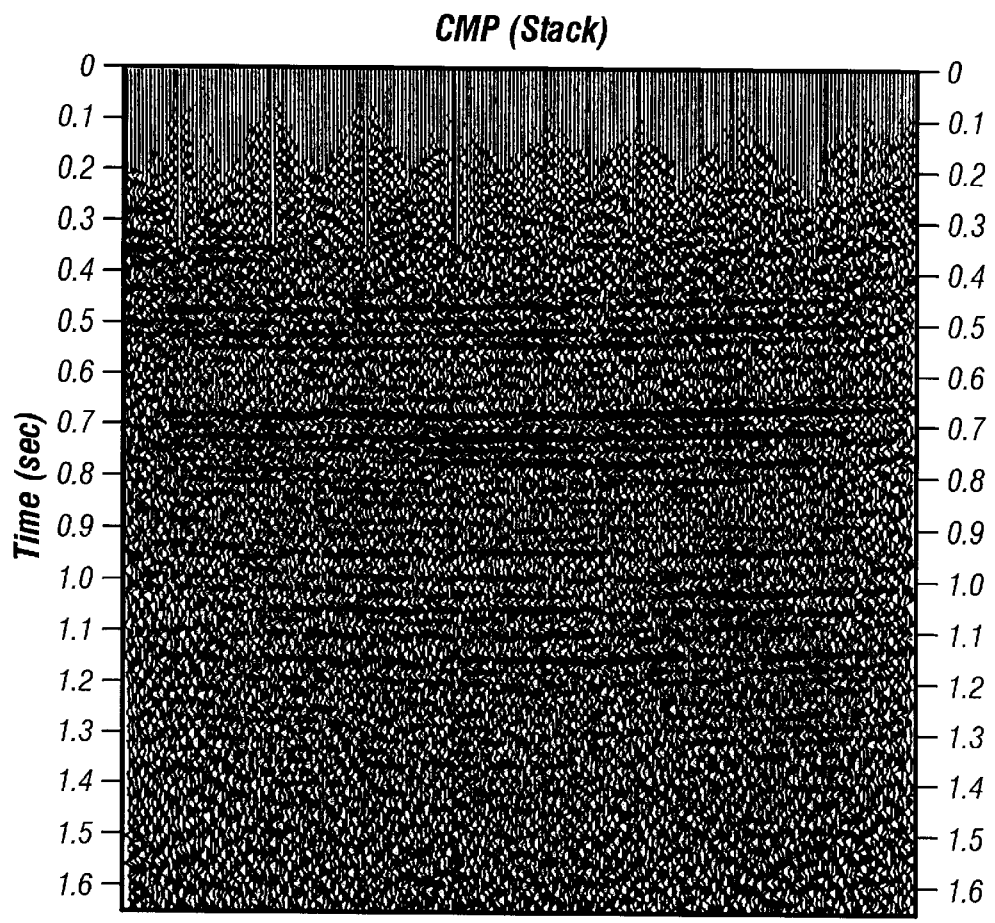
FIG. 10 (prior art) is in contrast to FIG. 9 and shows a plot in the offset-time domain of unfiltered, conventionally processed data, including the unprocessed data of FIG. 7, that have been stacked in accordance with industry practices.

By way of comparison, the data of FIG. 7, which had not been subject to filtering by the subject invention, and from other CMP gathers from the survey were conventionally processed and stacked in accordance with industry practice. The unfiltered, stacked data is shown in FIG. 10. It will be appreciated therefore that the stacked filter data of FIG. 9 show reflection events with much greater clarity due to the attenuation of noise by the novel methods. For example, the reflection signals appearing at 0.45 and 1.12 sec in FIG. 9 are not clearly present in FIG. 10.

Example 3

West African Production Area

Figure 11:
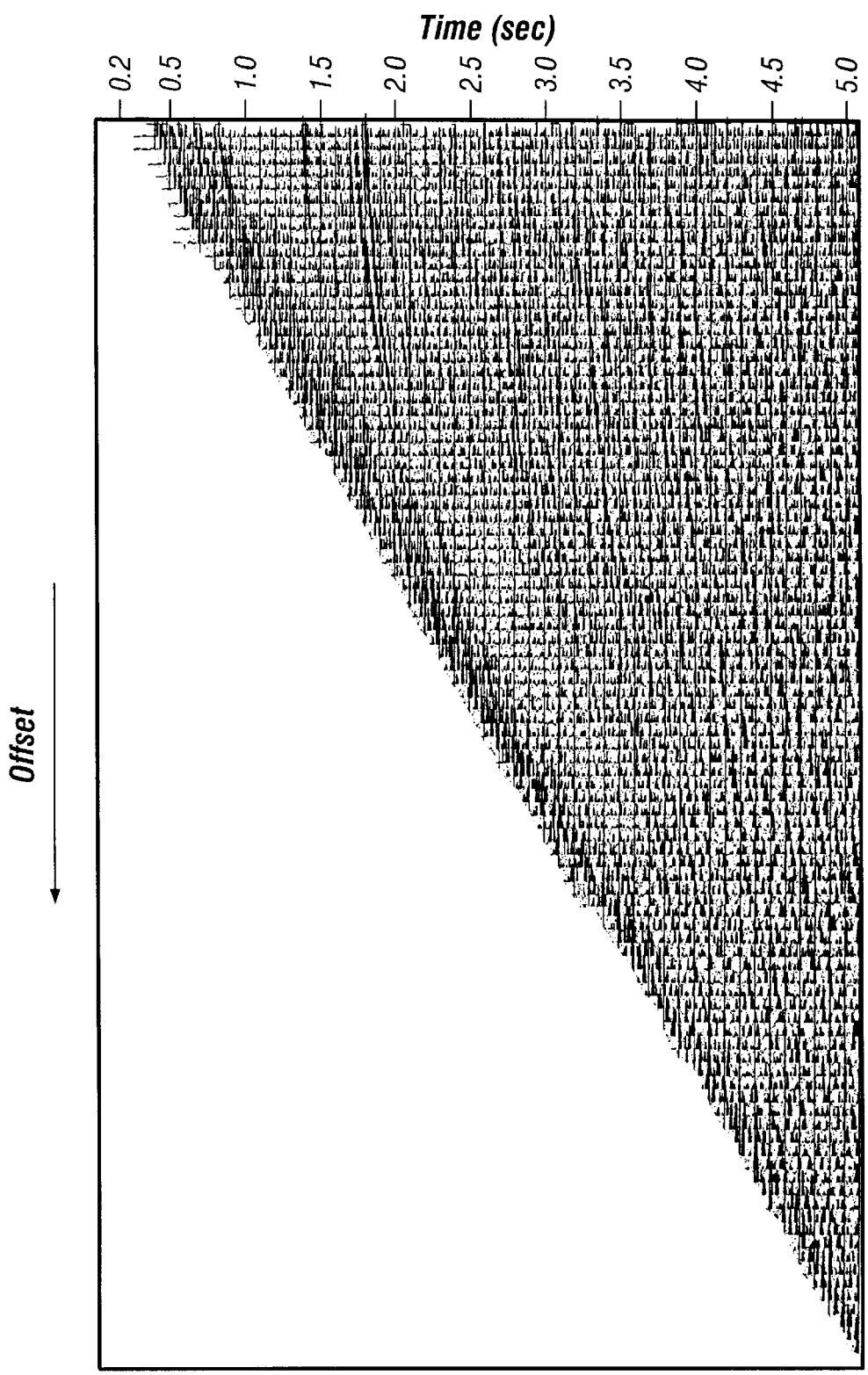
FIG. 11 is a plot in the offset-time domain of field records of seismic data recorded along a two-dimensional profile line in a West African production area and assembled in a common midpoint geometry gather.

A marine seismic survey was done in a West African offshore production area. FIG. 11 shows a portion of the data collected along a two-dimensional survey line. It is displayed in the offset-time domain and has been gathered into a common midpoint geometry. It will be noted that the data includes a significant amount of unwanted noise.

Figure 12:
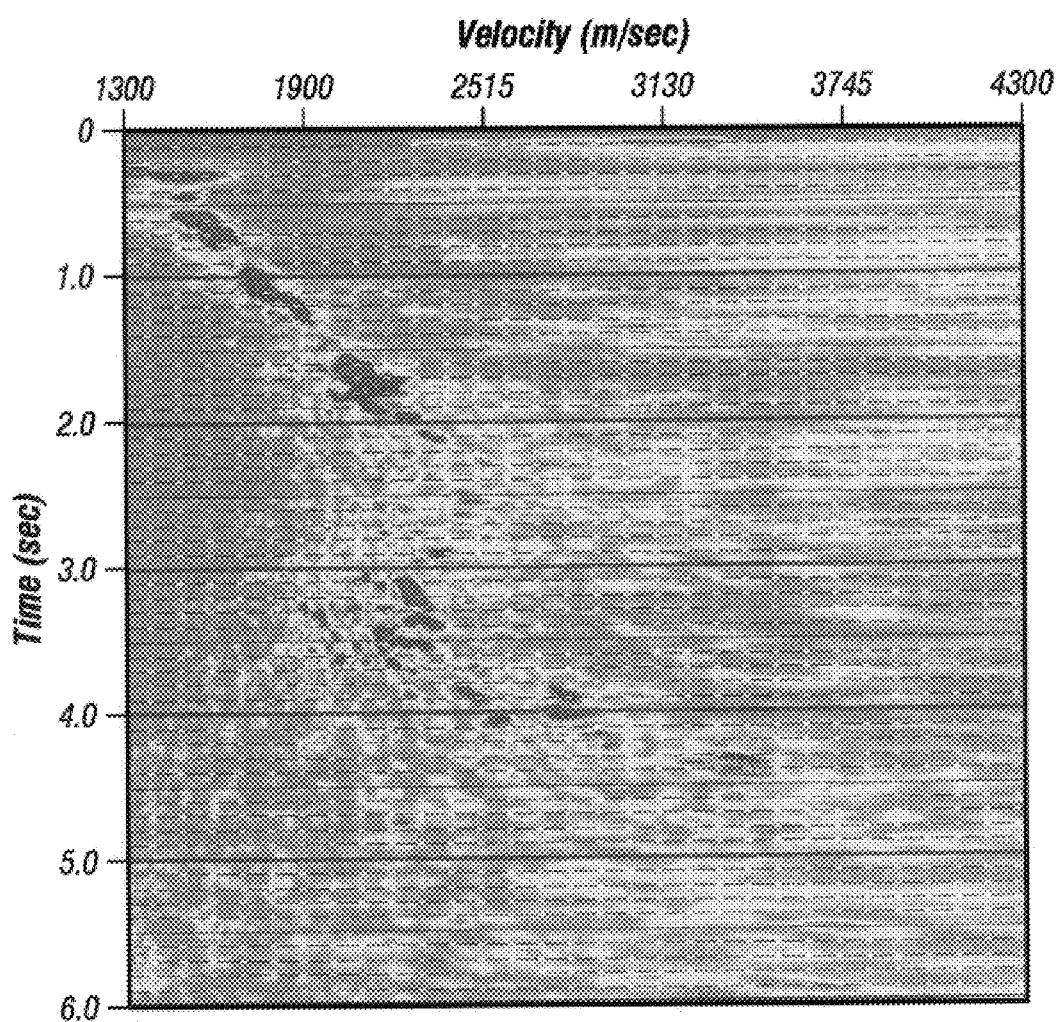
FIG. 12 is a semblance plot of the seismic data of FIG. 11.

In accordance with the subject invention, a conventional semblance analysis was performed on the data. A plot of the semblance analysis is shown in FIG. 12. This semblance plot was then used to identify a stacking velocity function and, based thereon, to define a filter that would preserve primary reflection events and eliminate noise, in particular a strong water bottom multiple present at approximately 0.44 sec in FIG. 12.

The data of FIG. 11 was also transformed into the time-slowness domain with a hyperbolic Radon transformation of the subject invention using an offset weighting factor $x^{0.5}$. A filter defined through the semblance analysis was applied to the transformed data, and the data was transformed back into the offset-time domain using a hyperbolic Radon inverse transform and an inverse of the offset weighting factor $p^{0.5}$. The data then was displayed, which display is shown in FIG. 13.

Figure 13:
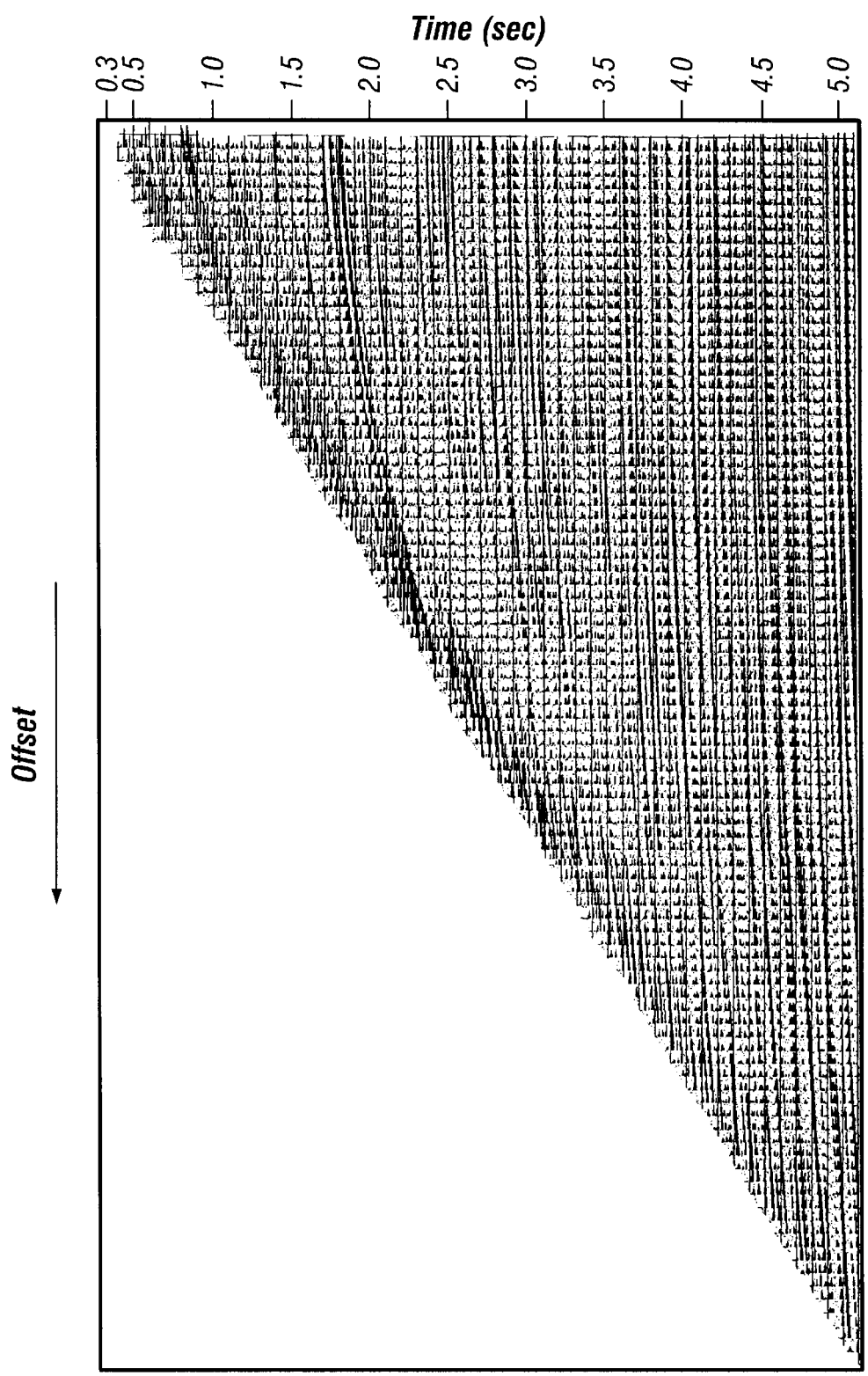
FIG. 13 is a plot in the offset-time domain of the seismic data of FIG. 11 after having been processed and filtered in accordance with the subject invention.

In FIG. 13, seismic reflection signals appear as hyperbolas, such as those starting from the near offset (right side) at approximately 1.7 sec and 2.9 sec. It will be noted that the unwanted noise that was present in the unprocessed data of FIG. 11 was severely masking the reflection hyperbolas and is no longer present in the processed display of FIG. 13.

Figure 14:
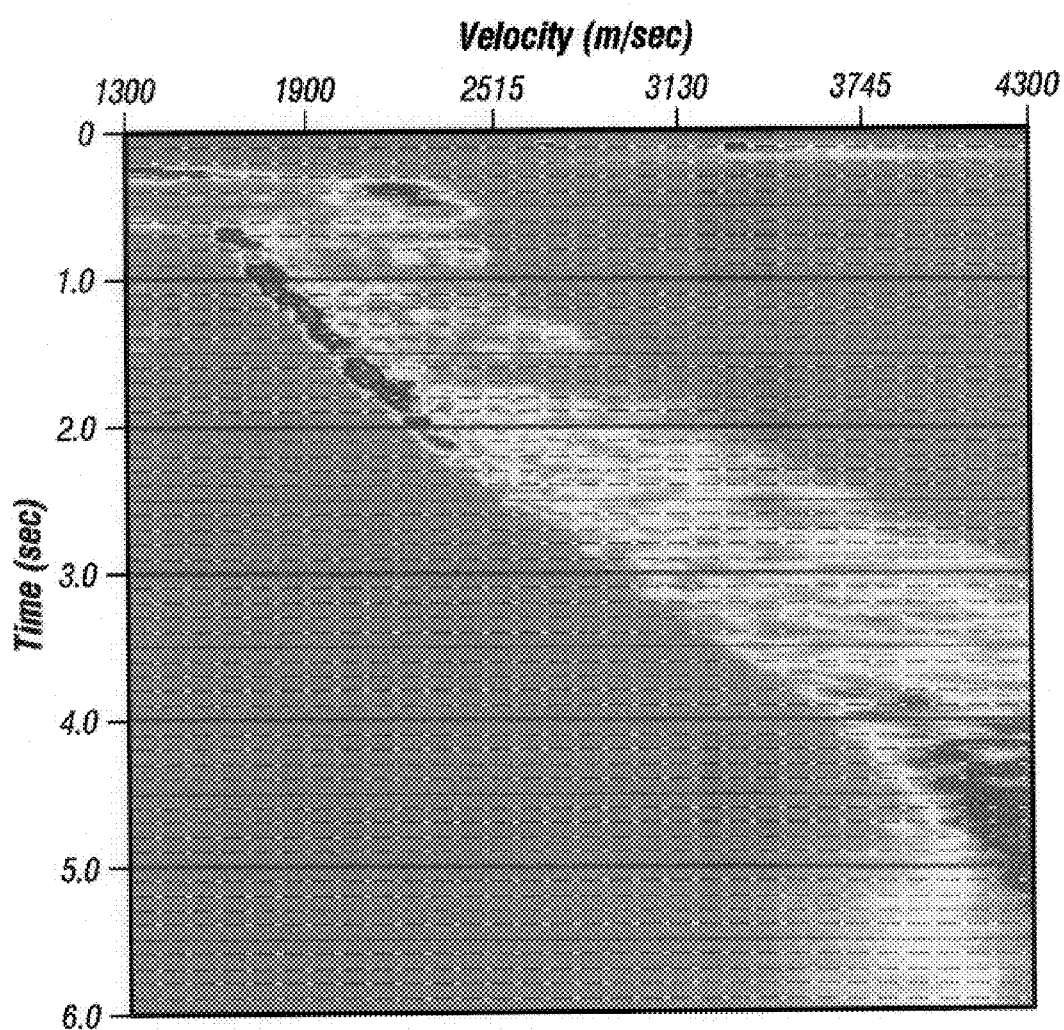
FIG. 14 is a semblance plot of the processed seismic data of FIG. 13.

The processed data of FIG. 13 then was subject to a conventional-semblance analysis. A plot of the semblance analysis is shown in FIG. 14. This semblance plot was then used to identify a stacking velocity function. By comparison to FIG. 12, it will be noted that the semblance plot of FIG. 14 shows the removal of various noise events, including the strong water bottom multiple present at approximately 0.44 sec in FIG. 12. Thus, it will be appreciated that the novel processes allow for a more precise definition of the stacking velocity function which then can be used in subsequent processing of the data, for example, as described below.

Figure 15:
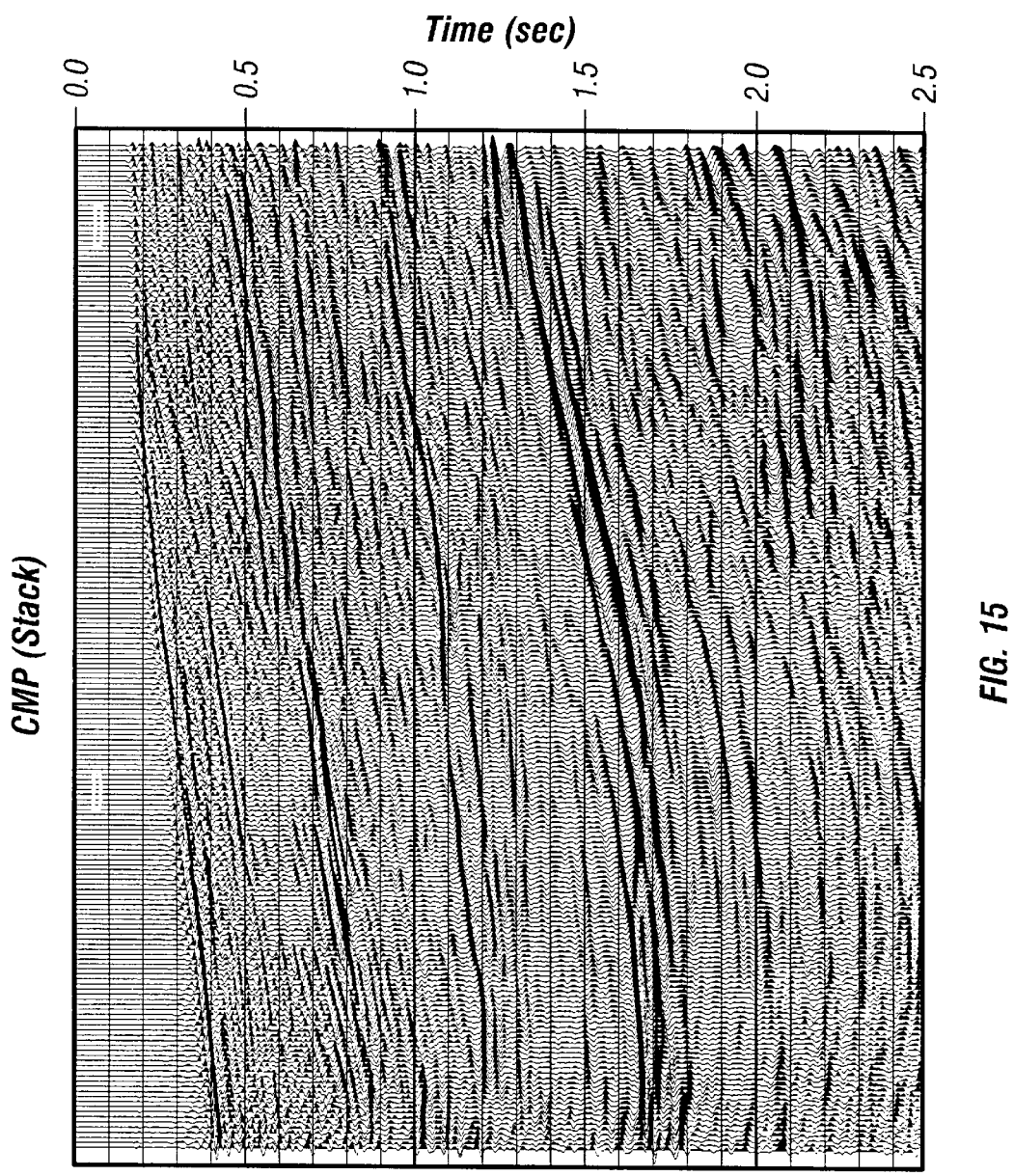
FIG. 15 is a plot in the offset-time domain of data processed and filtered according to the subject invention, including the data of FIG. 13, that have been stacked in accordance with industry practices using a stacking velocity function determined from the semblance plot of FIG. 14.

The data of FIG. 13, along with processed and filtered data from other CMP gathers in the survey, were then stacked in accordance with industry practice except that the stacking velocity function determined through the semblance plot of FIG. 14 was used. A plot of the stacked data is shown in FIG. 15. Seismic reflection signals appear as generally horizontal lines, from which the depth of geological formations may be inferred. For example, the reflective signals starting on the right side of the plot at approximately 0.41, 0.46, 1.29, and 1.34 sec. It will be noted, however, that the reflection signals in FIG. 15 slope and have slight upward curves from left to right. This indicates that the reflective formations are somewhat inclined, or what it referred to in the industry as "dip".

Figure 16:
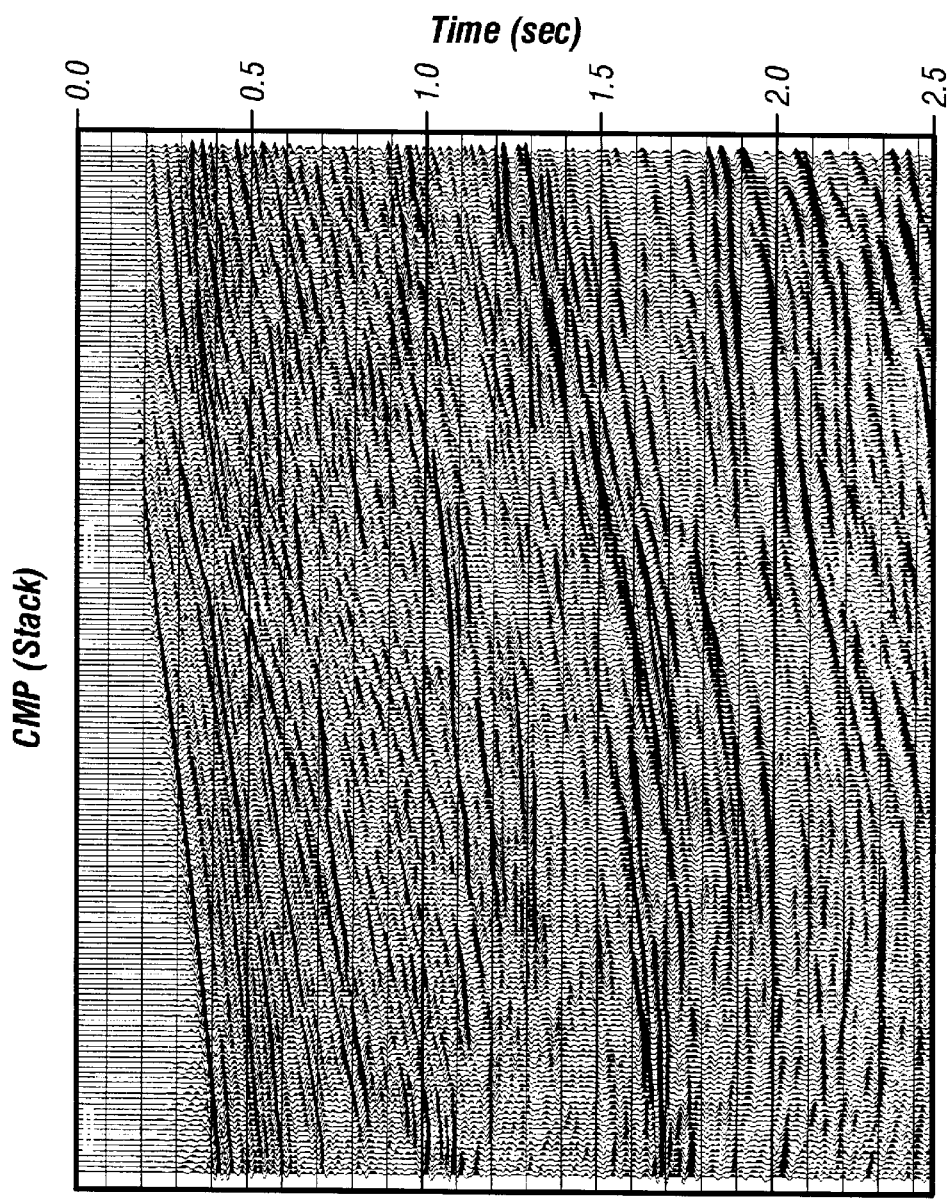
FIG. 16 (prior art) is in contrast to FIG. 15 and shows a plot in the offset-time domain of unfiltered, conventionally processed data, including the unprocessed data of FIG. 11, that have been stacked in accordance with industry practices.

By way of comparison, the unprocessed data of FIG. 11, along with data from other CMP gathers, were conventionally processed and then stacked in accordance with industry practice. The unfiltered, stacked data is shown in FIG. 16. It will be appreciated therefore that the stacked filter data of FIG. 15 show reflection events with much greater clarity due to the attenuation of noise by the novel methods. In particular, it will be noted that the reflection signals at 0.41 and 0.46 sec in FIG. 15 are not discernable in FIG. 16, and that the reflection signals at 1.29 and 1.34 sec are severely masked.

Example 4

Viosca Knoll Production Area

Figure 17:
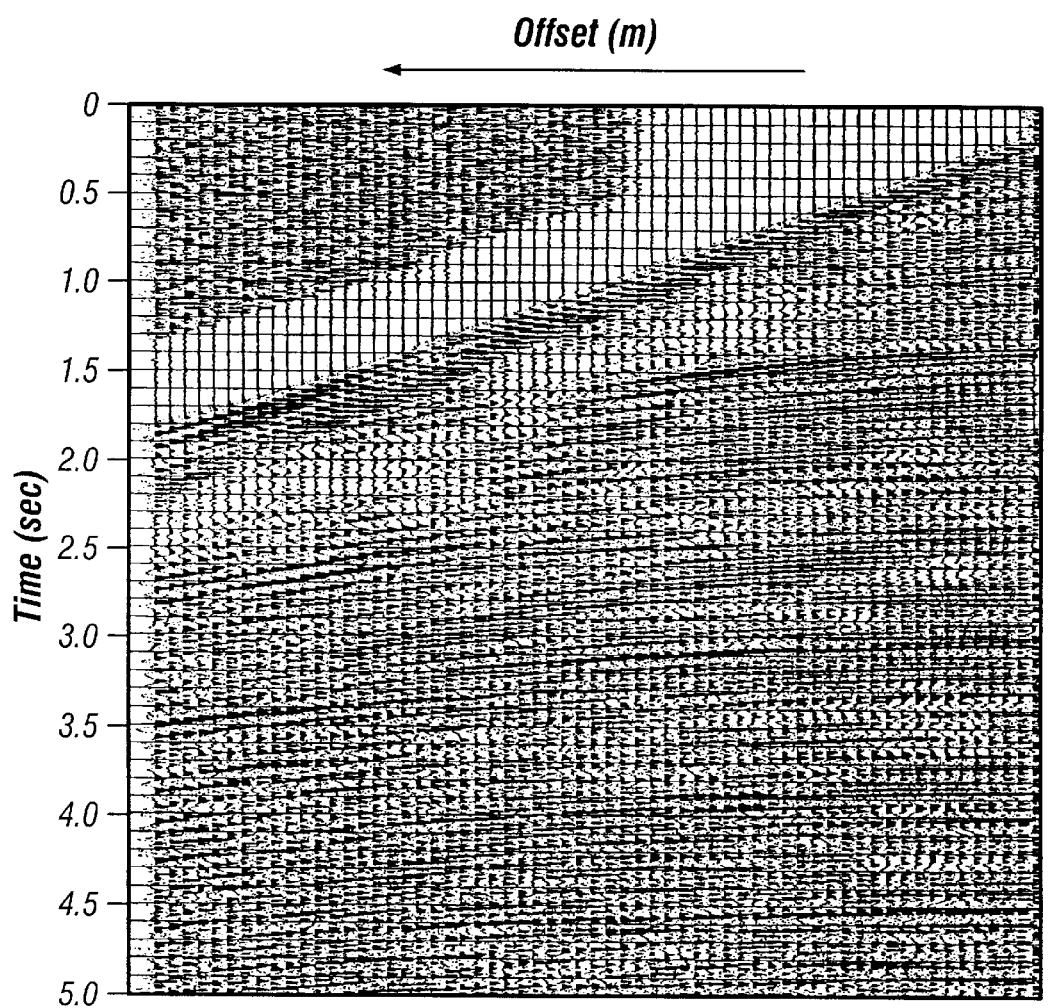
FIG. 17 is a plot in the offset-time domain of field records of seismic data recorded along a two-dimensional profile line in the Viosca Knoll region of the United States and assembled in a common midpoint geometry gather.

A marine seismic survey was done in the Viosca Knoll offshore region of the United States. FIG. 17 shows a portion of the data collected along a two-dimensional survey line. It is displayed in the offset-time domain and has been gathered into a common midpoint geometry. It will be noted that the data includes a significant amount of unwanted noise, including severe multiples created by short cable acquisition.

Figure 18:
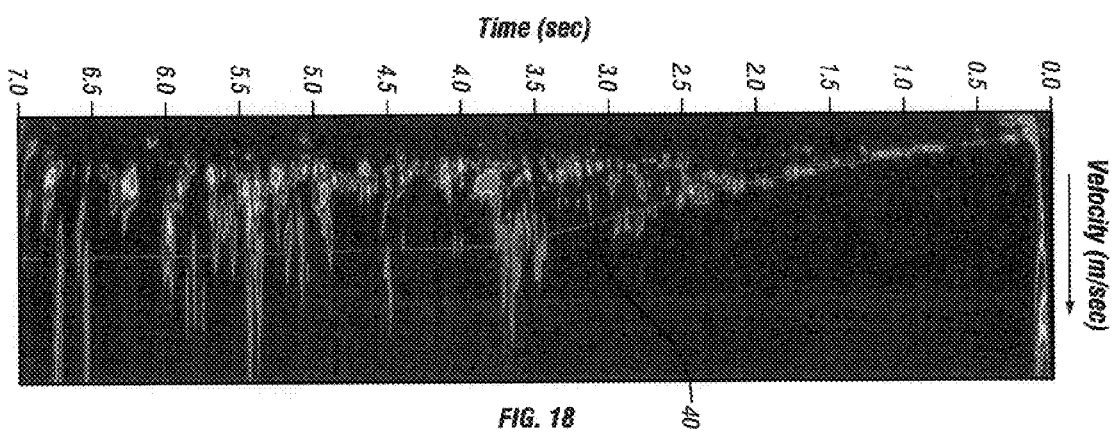
FIG. 18 is a semblance plot of the seismic data of FIG. 17.

In accordance with the subject invention, a conventional semblance analysis was applied to the data. A plot of the semblance analysis is shown in FIG. 18. This semblance plot was then used to identify a stacking velocity function and, based thereon, to define a filter that would preserve primary reflection events and eliminate noise, in particular the multiples caused by short cable acquisition that are present generally from approximately 2.5 to 7.0 sec. The stacking velocity function is represented graphically in FIG. 18 as line 40.

The data of FIG. 17 was also transformed into the time-slowness domain with a hyperbolic Radon transformation of the subject invention using an offset weighting factor $x^{0.5}$. A filter defined through the semblance analysis was applied to the transformed data, and the data was transformed back into the offset-time domain using a hyperbolic Radon inverse transform and an inverse of the offset weighting factor $p^{0.5}$ The data then was displayed, which display is shown in FIG. 19.

Figure 19:
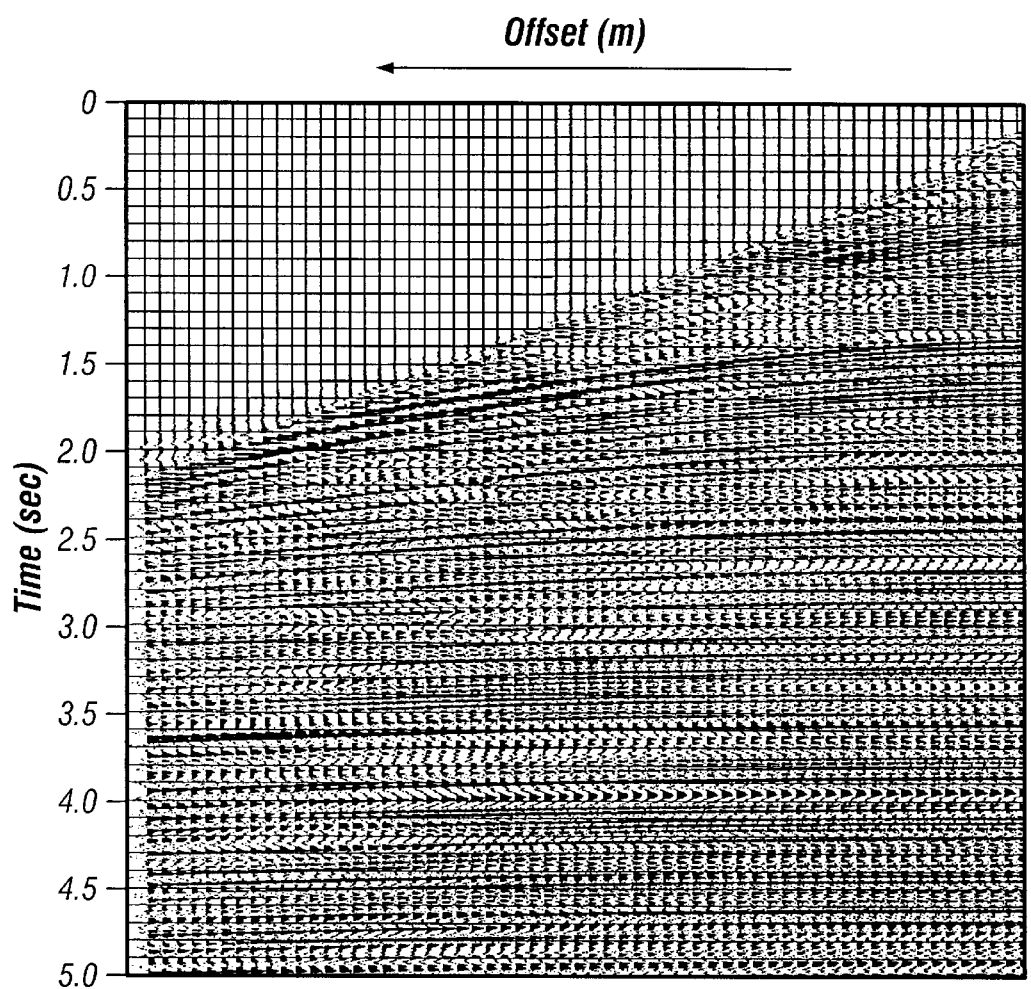
FIG. 19 is a plot in the offset-time domain of the seismic data of FIG. 17 after having been processed and filtered in accordance with the subject invention.

In FIG. 19, seismic reflection signals appear as hyperbolas, such as those beginning at the near offset (right side) below approximately 0.6 sec. It will be noted that the unwanted noise that was present in the unprocessed data of FIG. 17 below 0.6 sec and severely masking the reflection hyperbolas is no longer present in the processed display of FIG. 19. In particular, it will be noted that the reflection signals beginning at the near offset at approximately 2.0 and 2.4 sec in FIG. 19 are not discernable in the unfiltered data of FIG. 17.

Figure 20:
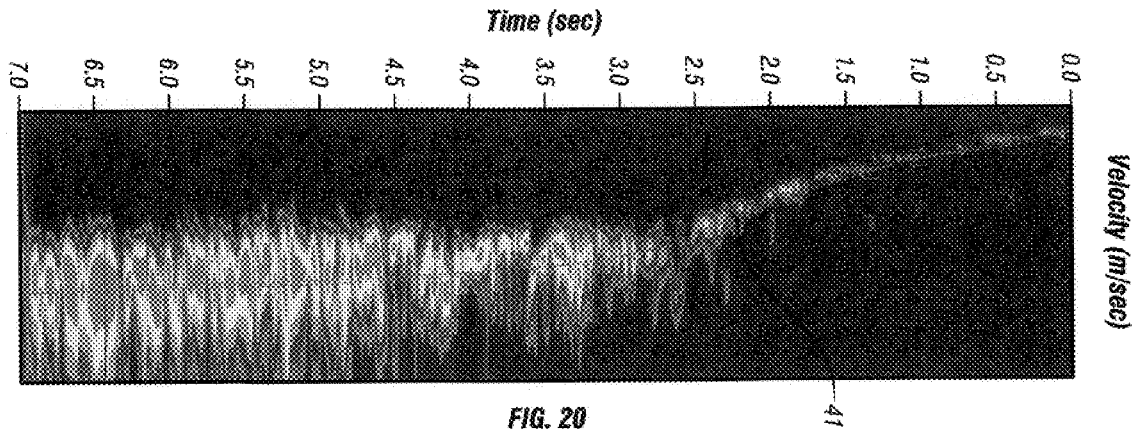
FIG. 20 is a semblance plot of the processed seismic data of FIG. 19.

The processed data of FIG. 19 then was subject to a conventional semblance analysis. A plot of the semblance analysis is shown in FIG. 20. By comparison to FIG. 18, it will be noted that the semblance plot of FIG. 20 shows the removal of various noise events, including the strong multiples located generally from 2.5 to 7.0 sec in FIG. 18 that were created by short cable acquisition. The semblance plot was then used to identify a stacking velocity function, which is represented graphically in FIG. 20 as line 41. Thus, it will be appreciated that the novel processes allow for a more precise definition of the stacking velocity function which then can be used in subsequent processing of the data, for example, as described below.

Figure 21:
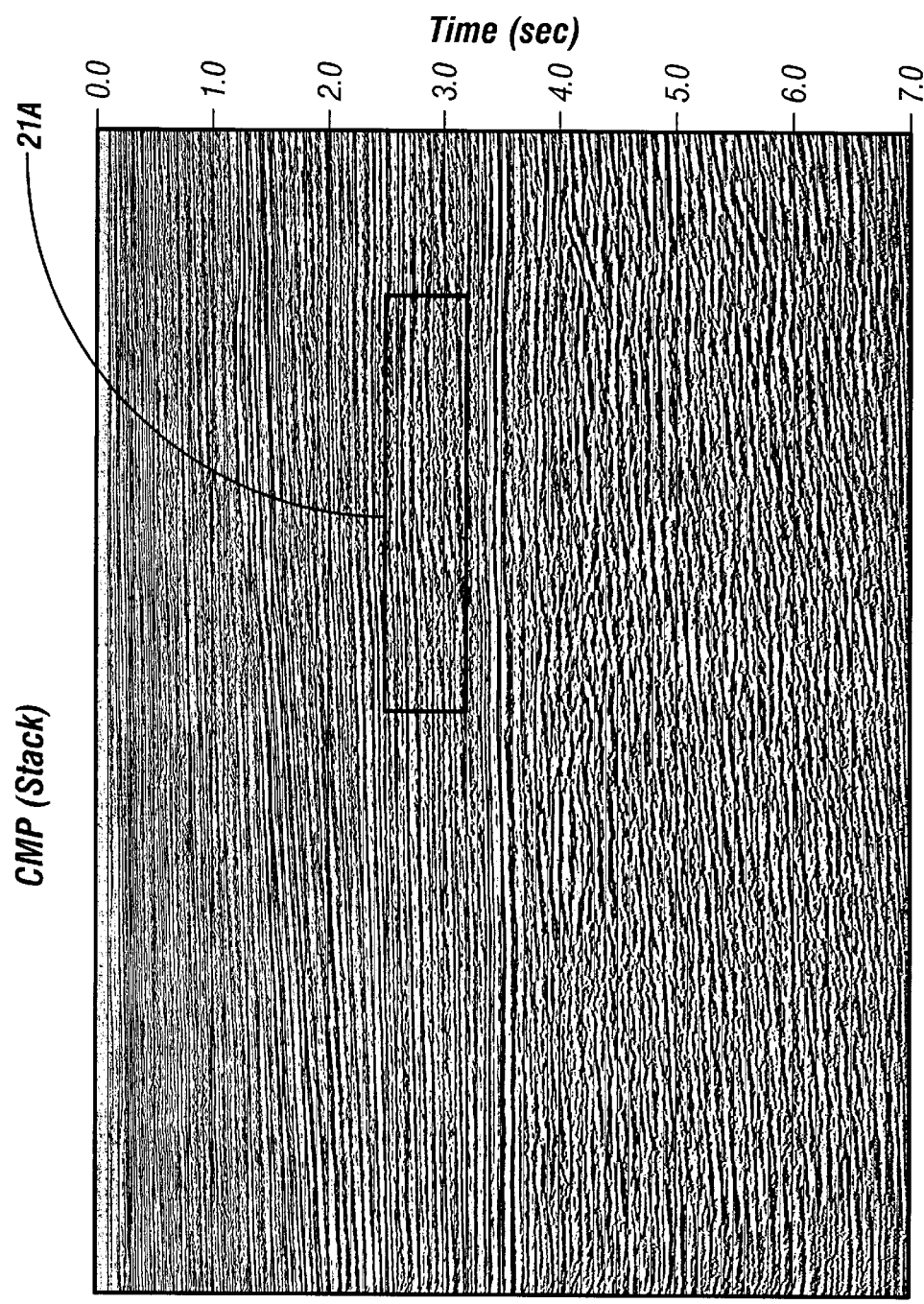
FIG. 21 is a plot in the offset-time domain of data processed and filtered according to the subject invention, including the data of FIG. 19, that has been stacked in accordance with industry practices using a stacking velocity function determined from the semblance plot of FIG. 20.
Figure 21A:
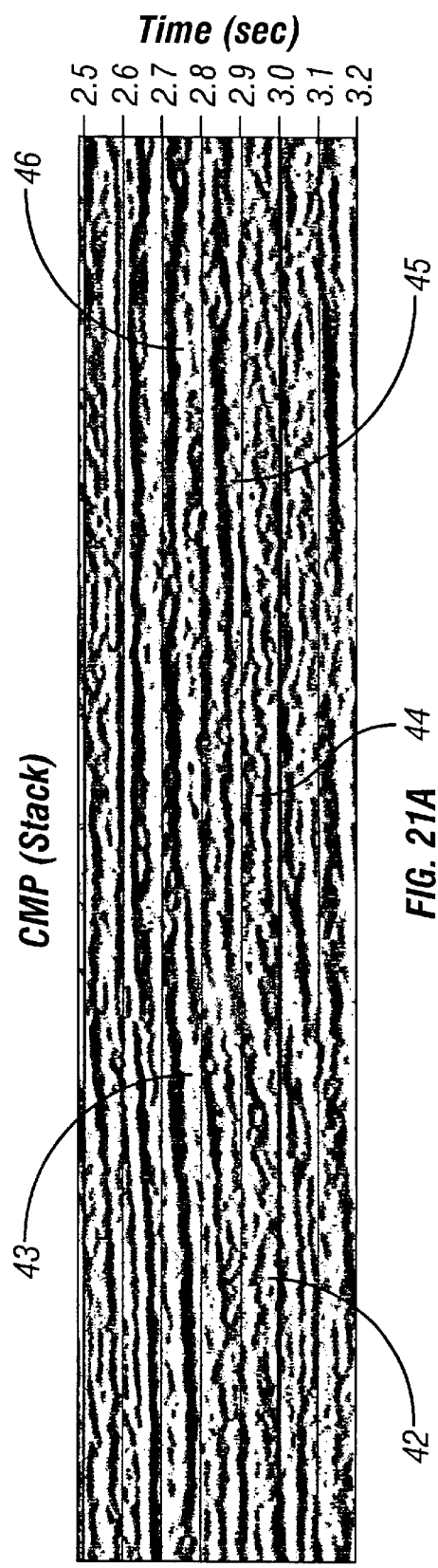
FIG. 21A is an enlargement of the area shown in box 21A of FIG. 21.

The data of FIG. 19, along with the data from other CMP gathers that had been processed and filtered with the novel methods, were then stacked in accordance with industry practice except that the stacking velocity function determined through the semblance plot of FIG. 20 was used. A plot of the stacked data is shown in FIG. 21. Seismic reflection signals appear as horizontal lines, from which the depth of geological formations may be inferred. In particular, the presence of various traps potentially holding reserves of oil or gas appear generally in areas 42, 43, 44, 45, and 46, as seen in FIG. 21A, which is an enlargement of area 21A of FIG. 21.

By way of comparison, the data of FIG. 19 and data from other CMP gathers in the survey was transformed into the time-slowness domain with a conventional parabolic Radon transformation that, in contrast to the processes of the subject invention, did not apply an offset weighting factor $x^n$. Filters defined through a conventional semblance analysis were applied to the CMP data gathers, and the data were transformed back into the offset-time domain using a conventional parabolic Radon inverse transform that did not apply an inverse offset weighting factor $p^n$.

Figure 22:
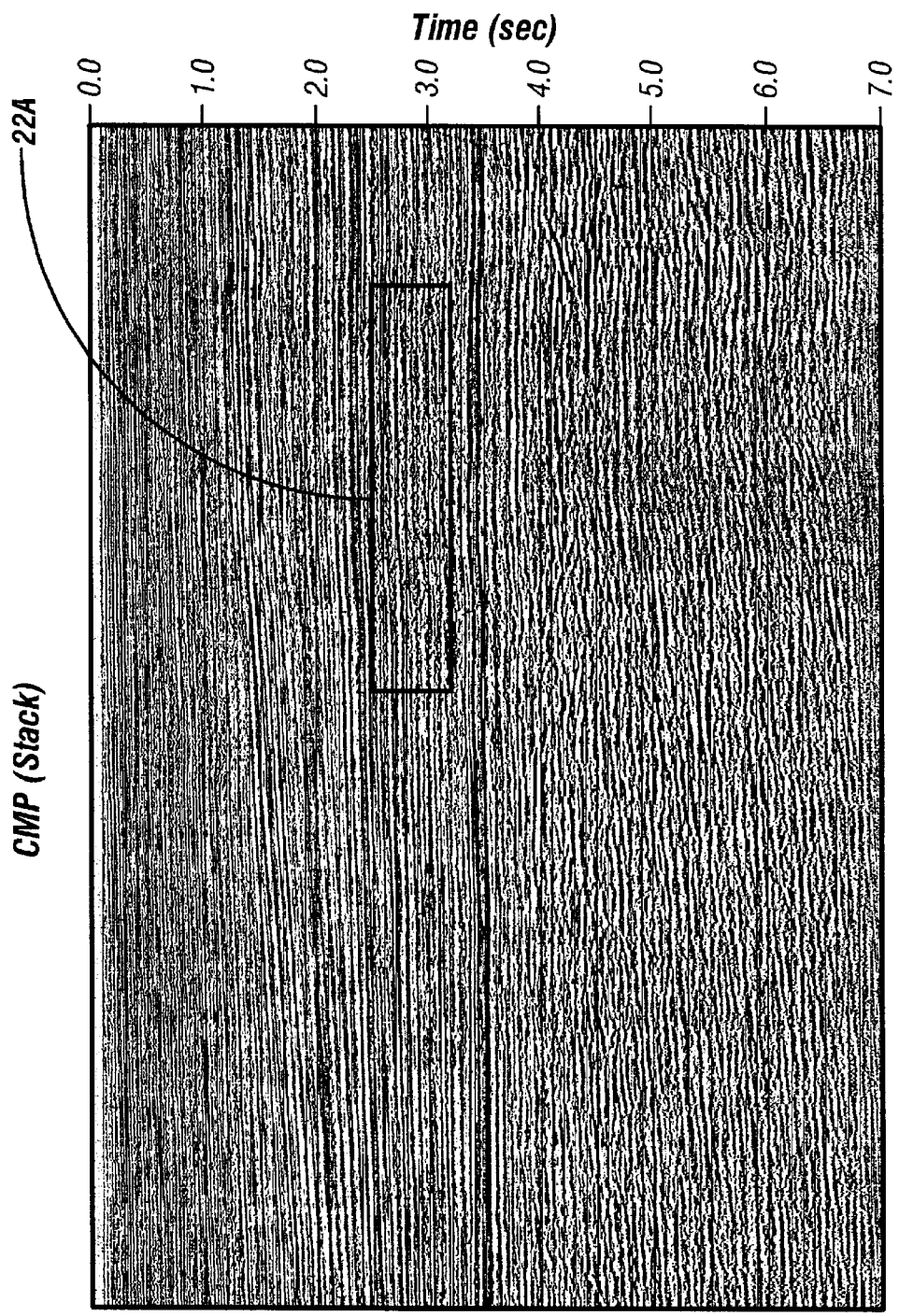
FIG. 22 (prior art) is in contrast to FIG. 21 and shows a plot in the offset-time domain of data, including the data of FIG. 17, that was processed and filtered in accordance with conventional parabolic Radon methods and then stacked in accordance with industry practices.
Figure 22A:
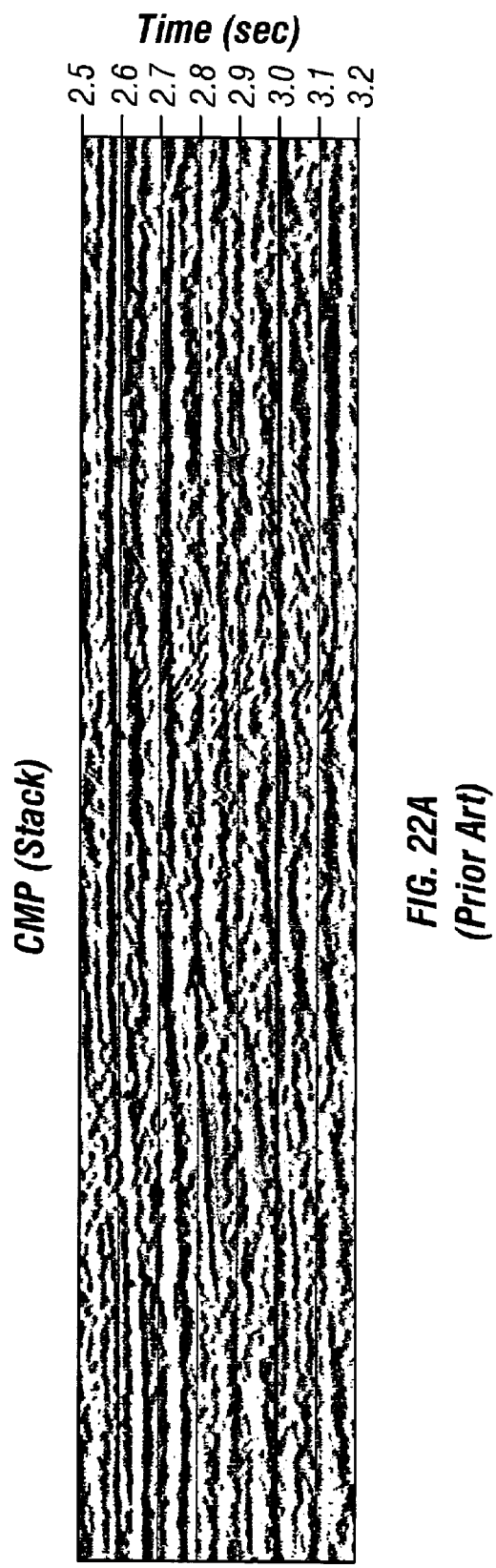
FIG. 22A (prior art) is an enlargement of the area shown in box 22A of FIG. 22.

The data that had been processed and filtered with the parabolic Radon forward and inverse transforms was then stacked in accordance with industry practice. A plot of the stacked data is shown in FIG. 22. Seismic reflection signals appear as horizontal lines, from which the depth of geological formations may be inferred. It will be noted, however, that as compared to the stacked plot of FIG. 21, reflection events are shown with much less clarity. As may best be seen in FIG. 22A, which is an enlargement of area 22A in FIG. 22, and which corresponds to the same portion of the survey profile as shown in FIG. 21A, traps 42, 43, 44, 45, and 46 are not revealed as clearly by the conventional process.

The foregoing examples demonstrate the improved attenuation of noise by the novel methods and thus, that the novel methods ultimately allow for more accurate inferences about the depth and composition of geological formations.

while this invention has been disclosed and discussed primarily in terms of specific embodiments thereof, it is not intended to be limited thereto. Other modifications and embodiments will be apparent to the worker in the art.

What is claimed is:

1. A method of processing seismic data to remove unwanted noise from meaningful reflection signals indicative of subsurface formations, comprising the steps of:

(c) obtaining field records of seismic data detected at a number of seismic receivers in an area of interest, said seismic data comprising signal amplitude data recorded over time and containing both primary reflection signals and unwanted noise events;

(d) assembling said seismic data into common geometry gathers in an offset-time domain;

(e) applying an offset weighting factor $x^n$ to said amplitude data, wherein 0<n<1;

(f) transforming said offset weighted amplitude data from the offset-time domain to the time-slowness domain using a Radon transformation;

(g) applying a corrective filter to the offset weighted, transformed data to enhance the primary reflection signal content of said data and to eliminate unwanted noise events;

(h) inverse transforming said enhanced signal content from the time-slowness domain back to the offset-time domain using an inverse Radon transformation; and (i) applying an inverse of the offset weighting factor $p^n$ to said inverse transformed data, wherein 0<n<1, thereby restoring the signal amplitude data for said enhanced signal content.

2. The method of claim 1, wherein said transformation and inverse transformation are performed according to sampling variables $\Delta t$, $\Delta x$, $\Delta \tau$, and $\Delta p$ and one or more of said sampling variables $\Delta t$, $\Delta x$, and $\Delta \tau$ are set at the corresponding sampling rates at which said seismic data field records were recorded.

3. The method of claim 1, wherein said transformation and inverse transformation are performed according to sampling variables $\Delta t$, $\Delta x$, $\Delta \tau$, and $\Delta p$, and $\Delta p$ is set at from about 0.5 to about 4.0 $\mu$sec/m.

4. The method of claim 1, wherein said transformation and inverse transformation are performed according to sampling variables $\Delta t$, $\Delta x$, $\Delta \tau$, and $\Delta p$, and $\Delta p$ is set at from about 0.5 to about 2.0 $\mu$sec/m.

5. The method of claim 1, wherein said seismic data is assembled into common midpoint geometry gathers.

6. The method of claim 1, wherein said seismic data is assembled into common source geometry gathers.

7. The method of claim 1, wherein said seismic data is assembled into common offset geometry gathers.

8. The method of claim 1, wherein said seismic data is assembled into common receiver geometry gathers.

9. The method of claim 1, wherein n in the offset weighting factor $x^n$ and the inverse of the offset weighting factor $p^n$ is approximately 0.5.

10. The method of claim 1, wherein the forward and inverse transform functions in said Radon transformations are selected from the transform functions for linear slant stack, parabolic, and hyperbolic kinematic travel time trajectories.

11. The method of claim 1, wherein said offset weighted amplitude data is transformed using a hyperbolic Radon transformation and inverse transformed using an inverse hyperbolic Radon transformation.

12. The method of claim 1, wherein said offset weighted amplitude data is transformed using a non-hyperbolic Radon transformation and inverse transformed using an inverse non-hyperbolic Radon transformation.

13. The method of claim 12, wherein the forward and inverse transform functions in said non-hyperbolic Radon transformations are selected to account for anisotropy, P-S converted waves, or wave-field separations.

14. The method of claim 1, wherein said offset weighting factor $x^n$ is applied and said amplitude data is transformed with a continuous Radon transformation defined as follows:

$$u(p, \tau) = \int_{-\infty}^{\infty} dx \int_{-\infty}^{\infty} dt\, d(x, t) x^n \delta[f(t, x, \tau, p)]$$

or a discrete Radon transformation approximating said continuous Radon transformation, and said enhanced signal content is inversed transformed and said inverse offset weighting factor $p^n$ is applied with a continuous inverse Radon transformation defined as follows:

$$d(x, t) = \int_{-\infty}^{\infty} dp \int_{-\infty}^{\infty} d\tau\, p^n \rho(\tau)^* u(p, \tau) \delta[g(t, x, \tau, p)]$$

or a discrete Radon transformation approximating said continuous inverse Radon transformation, where
  u(p, $\tau$)=transform coefficient at slowness p and zero-offset time $\tau$ d(x, t)=measured seismogram at offset x and two-way time t
  $x^n$=offset weighting factor (0<n<1)
  $p^n$=inverse offset weighting factor (0<n<1)
  $\rho(\tau)^*$=convolution of rho filter
  $\delta$=Dirac delta function
  $f(t, x, \tau, p)$=forward transform function
  $g(t, x, \tau, p)$=inverse transform function.

15. The method of claim 14, wherein where said forward transform function, $f(t, x, \tau, p)$, and said inverse transform function, $g(t, x, \tau, p)$, are selected from the transform functions for linear slant stack, parabolic, and hyperbolic kinematic travel time trajectories, which functions are defined as follows:

(a) transform functions for linear slant stack:

$$f(t, x, \tau, p) = t - \tau - px$$

$$g(t, x, \tau, p) = \tau - t + px$$

(b) transform functions for parabolic:

$$f(t, x, \tau, p) = t - \tau - px^2$$

$$g(t, x, \tau, p) = \tau - t + px^2$$

(c) transform functions for hyperbolic:

$$f(t, x, \tau, p) = t - \sqrt{\tau^2 + p^2 x^2}$$

$$g(t, x, \tau, p) = \tau - \sqrt{t^2 - p^2 x^2}.$$

16. The method of claim 1, wherein said offset weighting factor $x^n$ is applied and said amplitude data is transformed with a continuous hyperbolic Radon transformation defined as follows:

$$u(p, \tau) = \int_{-\infty}^{\infty} dx\, x^n d\left(x, \sqrt{\tau^2 + p^2 x^2}\right)$$

or a discrete hyperbolic Radon transformation approximating said continuous hyperbolic Radon transformation, and said enhanced signal content is inversed transformed and said inverse offset weighting factor $p^n$ applied with a continuous inverse hyperbolic Radon transformation defined as follows:

$$d(x, t) = \int_{-\infty}^{\infty} dp\, p^n \rho(\tau)^* u\left(p, \sqrt{\tau^2 - p^2 x^2}\right)$$

or a discrete inverse hyperbolic Radon transformation approximating said continuous inverse hyperbolic Radon transformation, where
$u(p, \tau)$ = transform coefficient at slowness p and zero-offset time $\tau$
$d(x, t)$ = measured seismogram at offset x and two-way time t
$x^n$ = offset weighting factor (0<n<1)
$p^n$ = inverse offset weighting factor (0<n<1)
$\rho(\tau)^*$ = convolution of rho filter
$\delta$ = Dirac delta function $$f(t, x, \tau, p) = t - \sqrt{\tau^2 + p^2 x^2}$$

$$g(t, x, \tau, p) = \tau - \sqrt{t^2 - p^2 x^2}.$$

17. The method of claim 1, wherein said offset weighting factor $x^n$ is applied and said amplitude data is transformed with a discrete Radon transformation defined as follows:

$$u(p, \tau) = \sum_{l=-L}^{L} \sum_{k=1}^{N} d(x_l, t_k) x_l^n \delta[f(t_k, x_l, \tau, p)] \Delta x_l \Delta t_k$$

where
$u(p, \tau)$ = transform coefficient at slowness p and zero-offset time $\tau$ $d(x_l, t_k)$ = measured seismogram at offset $x_l$ and two-way time $t_k$
$x_l^n$ = offset weighting factor at offset $x_l$ (0<n<1)
$\delta$ = Dirac delta function
$f(t_k, x_l, \tau, p)$ = forward transform function at $t_k$ and $x_l$ $$\Delta x_l = \frac{x_{l+1} - x_{l-1}}{2} \text{ for } l = 0, \pm 1, \dots, \pm(L-1)$$

$$\Delta x_L = x_L - x_{L-1}$$

$$\Delta x_{-L} = x_{-L+1} - x_{-L}$$

$$\Delta t_k = \frac{t_{k+1} - t_{k-1}}{2} \text{ for } k = 2, \dots, N-1$$

$$\Delta t_1 = t_2 - t_1$$

$$\Delta t_N = t_N - t_{N-1}$$

and said enhanced signal content is inversed transformed and said inverse offset weighting factor $p^n$ is applied with a discrete inverse Radon transformation defined as follows:

$$d(x, t) = \sum_{j=-J}^{J} \sum_{m=1}^{M} u(p_j, \tau_m) p_j^n \rho(\tau)^* \delta[g(t, x, \tau_m, p_j)] \Delta p_j \Delta \tau_m$$

where
$u(p_j, \tau_m)$ = transform coefficient at slowness $p_j$ and zero-offset time $\tau_m$
$d(x, t)$ = measured seismogram at offset x and two-way time t
$p_j^n$ = inverse offset weighting factor at slowness $p_j$ (0<n<1)
$\rho(\tau)^*$ = convolution of rho filter
$\delta$ = Dirac delta function
$g(t, x, \tau_m, p_j)$ = inverse transform function at $\tau_m$ and $p_j$ $$\Delta p_j = \frac{p_{j+1} - p_{j-1}}{2} \text{ for } j = 0, \pm 1, \dots, \pm(J-1)$$

$$\Delta p_J = p_J - p_{J-1}$$

$$\Delta p_{-J} = p_{-J+1} - p_{-J}$$

$$\Delta \tau_m = \frac{\tau_{m+1} - \tau_{m-1}}{2} \text{ for } m = 2, \dots, M-1$$

$$\Delta \tau_1 = \tau_2 - \tau_1$$

$$\Delta \tau_M = \tau_M - \tau_{M-1}.$$

18. The method of claim 17, wherein where said forward transform function, $f(t_k, x_l, \tau, p)$, and said inverse transform function, $g(t, x, \tau_m, p_j)$, are selected from the transform functions for linear slant stack, parabolic, and hyperbolic kinematic travel time trajectories, which functions are defined as follows:

(a) transform functions for linear slant stack:

$$f(t_k, x_l, \tau, p) = t_k - \tau - p x_l$$

$$g(t, x, \tau_m, p_j) = \tau_m - t + p_j x$$

(b) transform functions for parabolic:

$$f(t_k, x_l, \tau, p) = t_k - \tau - p x_l^2$$

$$g(t, x, \tau_m, p_j) = \tau_m - t + p_j x^2$$

(c) transform functions for hyperbolic:

$$f(t_k, x_l, \tau, p) = t_k - \sqrt{\tau^2 + p^2 x_l^2}$$

$$g(t, x, \tau_m, p_j) = \tau_m - \sqrt{t^2 - p^2 x_l^2}.$$

19. The method of claim 1, wherein said offset weighting factor $x^n$ is applied and said amplitude data is transformed with a discrete hyperbolic Radon transformation defined as follows:

$$u(p, \tau) = \sum_{l=-L}^{L} x_l^n d\left(x_l, \sqrt{\tau^2 + p^2 x_l^2}\right) \Delta x_l$$

where
  $u(p, \tau)$=transform coefficient at slowness p and zero-offset time $\tau$
  $x_l^n$=offset weighting factor at offset $x_l$ (0<n<1)

$$\Delta x_l = \frac{x_{l+1} - x_{l-1}}{2} \text{ for } l = 0, \pm 1, \ldots, \pm(L-1)$$

$$\Delta x_L = x_L - x_{L-1}$$

$$\Delta x_{-L} = x_{-L+1} - x_{-L}$$

and said enhanced signal content is inversed transformed and said inverse offset weighting factor $p^n$ applied with a discrete inverse hyperbolic Radon transformation defined as follows:

$$d(x, t) = \sum_{j=-J}^{J} p_j^n \rho(\tau) * u\left(p_j, \sqrt{t^2 - p_j^2 x^2}\right) \Delta p_j$$

where
  d(x, t)=measured seismogram at offset x and two-way time t
  $p_j^n$=inverse offset weighting factor at slowness $p_j$ (0<n<1)
  $\rho(\tau)$*=convolution of rho filter $$\Delta p_j = \frac{p_{j+1} - p_{j-1}}{2} \text{ for } j = 0, \pm 1, \ldots, \pm(J-1)$$

$$\Delta p_J = p_J - p_{J-1}$$

$$\Delta p_{-J} = p_{-J+1} - p_{-J}.$$

20. The method of claim 1, wherein said corrective filter is determined by:
  (c) performing a semblance analysis on said amplitude data to generate a semblance plot; and
  (d) performing a velocity analysis on said semblance plot to define a stacking velocity function and said corrective filter.

21. The method of claim 20, wherein an offset weighting factor $x^n$ is applied to said amplitude data prior to performing said semblance analysis.

22. The method of claim 20, wherein said semblance analysis is performed according to selected sampling variables $\Delta t$, $\Delta x$, $\Delta \tau$, and $\Delta p$, and one or more of said sampling variables $\Delta t$, $\Delta x$, and $\Delta \tau$ are set at the corresponding sampling rates at which said seismic data field records were recorded.

23. The method of claim 20, wherein said semblance analysis is performed in the Tau-P domain.

24. The method of claim 1, wherein said corrective filter is selected from the filters for common midpoint, common source, common offset, and common receiver geometry gathers, which filters are defined as follows:
  (a) common midpoint filter:

$$\frac{1}{v_s(1+r_2)} \leq p \leq \frac{1}{v_s(1-r_1)}$$

(b) common source filter:

$$p \leq \left(\frac{1}{1+r_3}\right) p_R$$

(c) common receiver filter:

$$p \leq \left(\frac{1}{1+r_4}\right) p_I$$

(d) common offset filter:

$$p \leq \left(\frac{1}{1+r_5}\right) p_C$$

where $r_1$, $r_2$, $r_3$, $r_4$, and $r_5$ are percentages expressed as decimals.

25. The method of claim 1, further comprising the step of forming a display of said restored data.

26. A method for determining a stacking velocity function, which method comprises the method of claim 1 and further comprises the steps of:
  (c) performing a semblance analysis on said restored data to generate a second semblance plot; and
  (d) performing a velocity analysis on said second semblance plot to define a second stacking velocity function.

27. A method for determining a stacking velocity function, which method comprises the method of claim 1 and further comprises the steps of:
  (c) applying an offset weighting factor $x^n$ to said restored amplitude data, wherein 0<n<1;
  (d) performing a semblance analysis on said offset weighted, restored data to generate a second semblance plot; and
  (e) performing a velocity analysis on said second semblance plot to define a second stacking velocity function.

* * * * *

UNITED STATES PATENT AND TRADEMARK OFFICE
CERTIFICATE OF CORRECTION

PATENT NO.    : 6,691,039 B1
DATED         : February 10, 2004
INVENTOR(S)   : Lawrence C. Wood It is certified that error appears in the above-identified patent and that said Letters Patent is hereby corrected as shown below:

<u>Column 4,</u>
Line 65, the equation should read as follows: $g(t,x,\tau,p) = \tau - \sqrt{t^2 - p^2 x^2}$ <u>Column 12,</u>
Line 25, the equation should read as follows: $f(t,x,\tau,p) = t - \tau - px^2$ <u>Column 13,</u>
Line 36, the equation should read as follows: $\Delta t_1 = t_2 - t_1$ <u>Column 14,</u>
Line 65, the equation should read as follows: $u(p,\tau) = A\delta(t_1 - \tau - px_1)$ Line 20, the equation should read as follows:

Line 30, the equation should read as follows: $t^2 = t_1^2 + \dfrac{x^2}{v^2}$

<u>Column 16,</u>
Line 15, the equation should read as follows: $1 = \dfrac{\tau^2}{t_1^2} + \dfrac{p^2 x_1^2}{t_1^2}$ Line 21, the equation should read as follows: $\left.\dfrac{\partial t_x}{\partial R}\right|_{I=I_o} = \dfrac{\partial t_x \partial C}{\partial C \partial R} + \dfrac{\partial t \partial x}{\partial x \partial R}$ Line 31, the equation should read as follows: $C = \dfrac{I+R}{2}$ $p_R = -\left.\dfrac{\partial t_x}{\partial R}\right|_I$

UNITED STATES PATENT AND TRADEMARK OFFICE
CERTIFICATE OF CORRECTION

PATENT NO. : 6,691,039 B1
DATED : February 10, 2004
INVENTOR(S) : Lawrence C. Wood It is certified that error appears in the above-identified patent and that said Letters Patent is hereby corrected as shown below:

Column 16, cont'd,
Line 41, the equation should read as follows: $p_R = \frac{1}{2} p_C + p_x$ Column 17,
Line 16, the equation should read as follows: $t_x = \sqrt{\tau^2 + p^2 x^2}$ Lines 21, 37 and 49, delete "$(p_l)$" and insert therein -- $(p_I)$ --.
Line 26, the equation should read as follows: -- $p_1 = \frac{1}{2} p_c - p_x$ --

Line 41, the equation should read as follows: $p \leq \left(\frac{1}{1+r_4}\right) p_I$ Line 54, the equation should read as follows: $p_1 = \frac{1}{2} p_c - p_x$ Column 18,
Line 16, delete "(".

Column 19,
Line 61, the equation should read as follows: $p_{-J} < p_{-+J} < \ldots < p_{J-1} < p_J$ Column 20,
Line 1, the equation should read as follows: $d(x,t) = \sum_{J=-J}^{J} \sum_{m=1}^{M} u(p_j, \tau_m) p_j^{\,n} \rho(\tau) * \delta[g(t,x,\tau_m,p_j)] \Delta p_j \Delta \tau_m$ Line 36, the equation should read as follows: $d(x,t) = \sum_{j=-J}^{J} p_j^{\,n} \rho(\tau) * u(p_j, t - p_j x^2) \Delta p_j$ Column 22,
Line 10, the equation should read as follows: $t = \sqrt{T_o^2 + \frac{x^2}{v_s^2}}$ Column 27,
Line 21, delete "while", and insert therein -- While --.
Lines 26-53, the subparagraphs therein should read -- (a) through (g) --.

Column 28,
Lines 48-51, should be formated as follows:
$u(p,\tau)$ = transfoirm coefficient at slowness p and zero-offset time $\tau$
$d(x,t)$ = measured seismogram at offset $x$ and two-way $t$

UNITED STATES PATENT AND TRADEMARK OFFICE
CERTIFICATE OF CORRECTION

PATENT NO. : 6,691,039 B1
DATED : February 10, 2004
INVENTOR(S) : Lawrence C. Wood It is certified that error appears in the above-identified patent and that said Letters Patent is hereby corrected as shown below:

Column 29,
Line 11, the equation should read as follows: $g(t,x,\tau,p) = \tau - \sqrt{t^2 - p^2 x^2}$ Line 46, , the equation should read as follows: $g(t,x,\tau,p) = \tau - \sqrt{t^2 - p^2 x^2}$ Column 30,
Line 65, the equation should read as follows: $f(t_k, x_l, \tau, p) = t_k - \sqrt{\tau^2 + p^2 x_l^2}$ Column 32,
Line 21, the equation should read as follows: $p \leq \left(\frac{1}{1+r_4}\right) p_l$ Signed and Sealed this Twenty-fourth Day of August, 2004

JON W. DUDAS
*Director of the United States Patent and Trademark Office*